(12) United States Patent
Moore et al.

(10) Patent No.: US 6,333,390 B1
(45) Date of Patent: Dec. 25, 2001

(54) BRANCHED AND HYPERBRANCHED POLYETHERIMIDES

(75) Inventors: Jeffrey S. Moore, Savoy; D. Scott Thompson; Larry J. Markoski, both of Champaign, all of IL (US)

(73) Assignee: The Board of Trustees of the University of Illinois, Champaign, IL (US)

( * ) Notice: Subject to any disclaimer, the term of this patent is extended or adjusted under 35 U.S.C. 154(b) by 0 days.

(21) Appl. No.: 09/435,337

(22) Filed: Nov. 5, 1999

Related U.S. Application Data

(60) Provisional application No. 60/107,244, filed on Nov. 5, 1998.

(51) Int. Cl.$^7$ .................................................. C08G 73/10
(52) U.S. Cl. .............................. 528/28; 528/170; 528/29
(58) Field of Search ................................. 528/170, 28, 29

(56) References Cited

U.S. PATENT DOCUMENTS

| | | |
|---|---|---|
| 4,297,474 | 10/1981 | Williams, III et al. . |
| 4,663,378 | 5/1987 | Allen . |
| 4,794,155 | 12/1988 | Woo et al. . |
| 5,041,516 | 8/1991 | Frechet et al. . |
| 5,194,568 | 3/1993 | Gregory et al. . |
| 5,214,105 | 5/1993 | Frechet . |
| 5,264,538 | 11/1993 | Mullins et al. . |
| 5,281,675 | 1/1994 | Hefner, Jr. et al. . |
| 5,362,837 | 11/1994 | Takekoshi et al. . |
| 5,663,260 | 9/1997 | Frechet et al. . |
| 5,807,971 | 9/1998 | Gozzini et al. . |

OTHER PUBLICATIONS

Bryant et al. Abstracts of the 4th International Conference on Polyimides, II 69–72, 1991, Ellenville, N.Y.*

Thorn, Denny, and Babson, Synthesis of Potentially Cytotoxic Compound 5–[Bis(2–chloroethyl)amino]–1,3–phenylene Biscarbamate, *J. Org. Chem.*, vol. 40, No. 11, pp. 1556–1558 (1975).

ULTEM® product information retrieved from the following websites on Nov. 3, 1999: www.ecomplastics.com/ecomplastics/ultem.html; www.plastifab.ca/ultemfr.html; www.ge.com/plastics/americas/products/product/ultem; www.ge.com/plastics/americas/products/products/ultem/detail.html; and www.ge.com/plastics/americas/products/product/ultem/features.html.

White, D.M. et al., Polyetherimides Via Nitro–Displacement Polymerization: Monomer Synthesis and 13C–NMR Analysis of Monomers and Polymers, Journal of Polymer Science: Polymer Chemistry Edition, 1981, vol. 19, pp. 1635–1658.

Kim, Y. H., Hyperbranched Polymers 10 Years After, Journal of Polymer Science: Part A: Polymer Chemistry, Apr. 1998, vol. 36, pp. 1685–1698.

* cited by examiner

*Primary Examiner*—Robert Dawson
*Assistant Examiner*—Kuo-Liang Peng
(74) *Attorney, Agent, or Firm*—Banner & Witcoff, Ltd.

(57) ABSTRACT

Branched or hyperbranched polymeric structures which contain at least one etherimide branch point, more specifically from stable $A_1B_n$ (where $n \geq 2$), AB, AA, and BB monomers; $A_m$ end-capping agents (where m=1); $B_n$ cores (where $n \geq 1$) and combinations thereof; with controllable degrees of branching (DB=0–1), molecular architectures, end-group compositions, along with methods for their preparation.

22 Claims, 32 Drawing Sheets

Synthesis of $A_mB_n$ monomers

$A_mB_n$ monomers star polymers(Bn core + AB monomer)

Linear AB polymerizations (DB=0)

FIGURE 3A
hyperbranched AB/AB₂ co-polymerizations (DB=0-0.6)

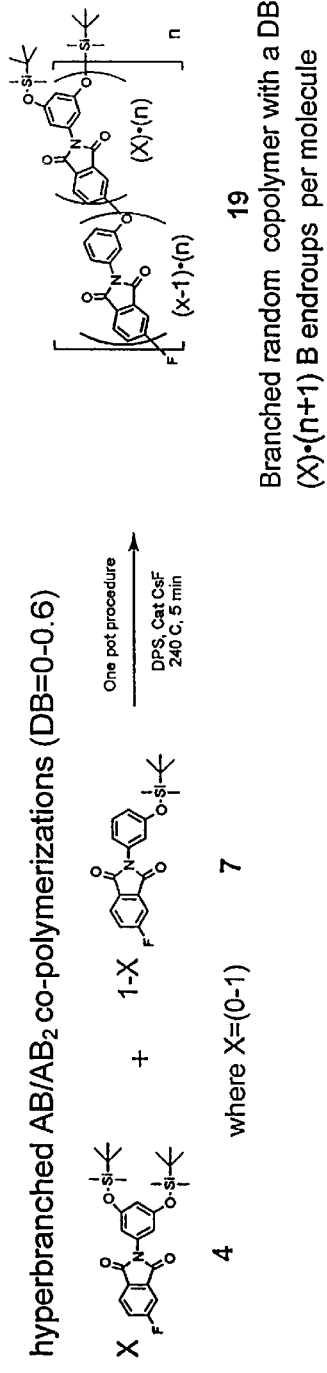

FIGURE 3B
hyperbranched AB/AB₂ co-polymerizations (DB=0-0.6)

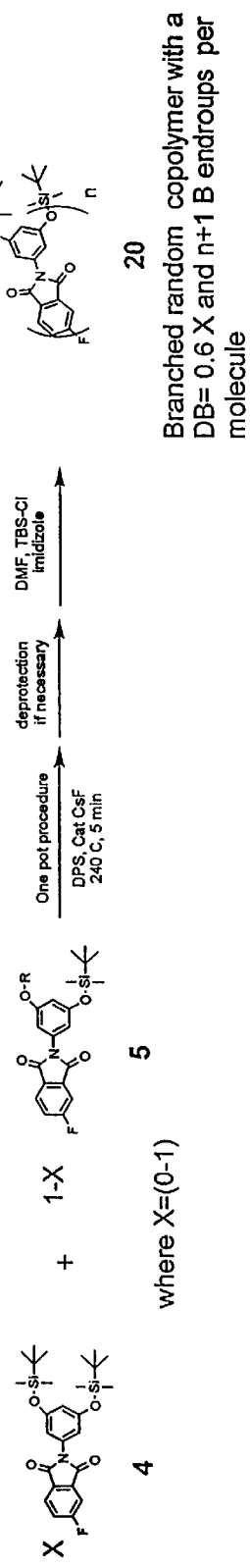

FIGURE 3C
Definition of repeat unit designation for hyperbranched polymers to be used throughout document

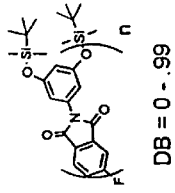
DB = 0 - .99

This repeat unit, even though it appears to designate a linear polymer, correctly describes the hyperbanched polymer in terms of the correct number of terminal groups with respect to repeat units (n+1). When designated with a degree of branching this repeat unit description will indicate a branched or hyperbranched polymer or segment of a copolymer and will be used to describe hyperbranched polymers throughout this patent.

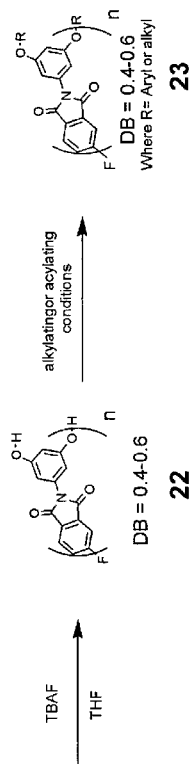
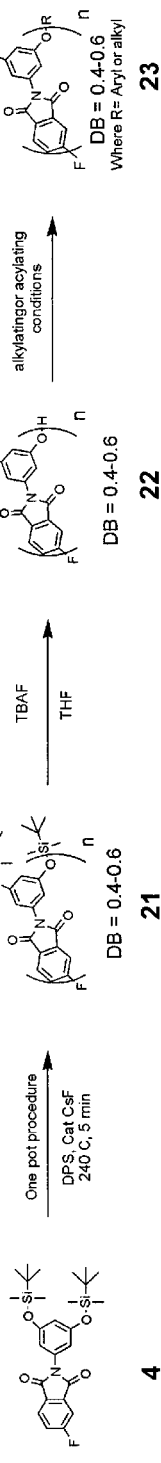
FIGURE 4A
hyperbranched AB$_2$ polymerizations (DB=0.4-0.6)
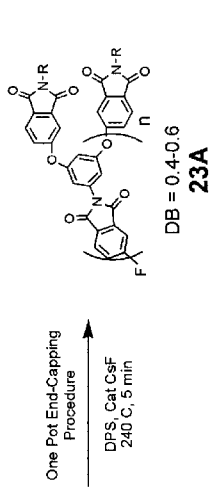
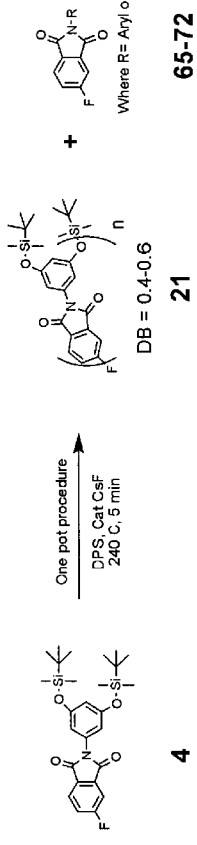
FIGURE 4B
hyperbranched AB$_2$ polymerizations (DB=0.4-0.6)
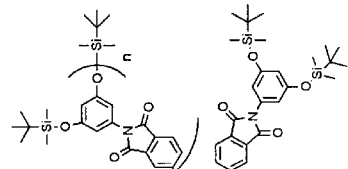
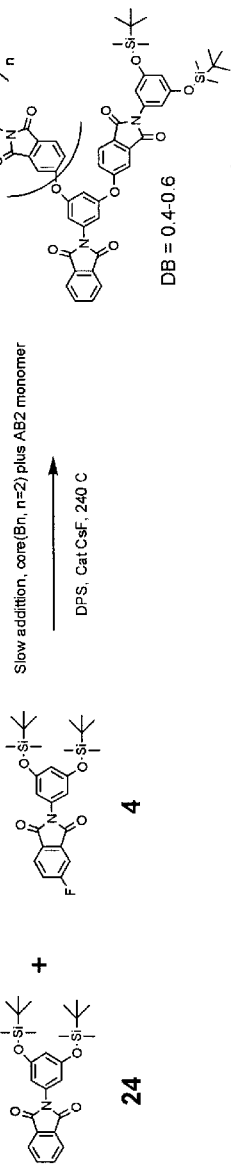
FIGURE 4C
hyperbranched AB$_2$ polymerizations (DB=0.4-0.6)

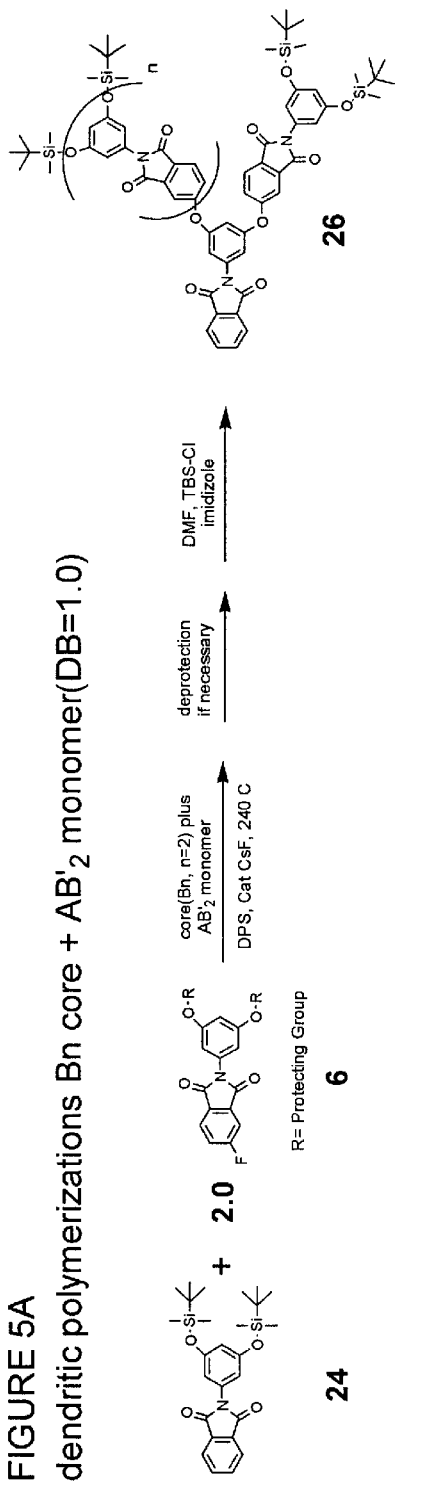
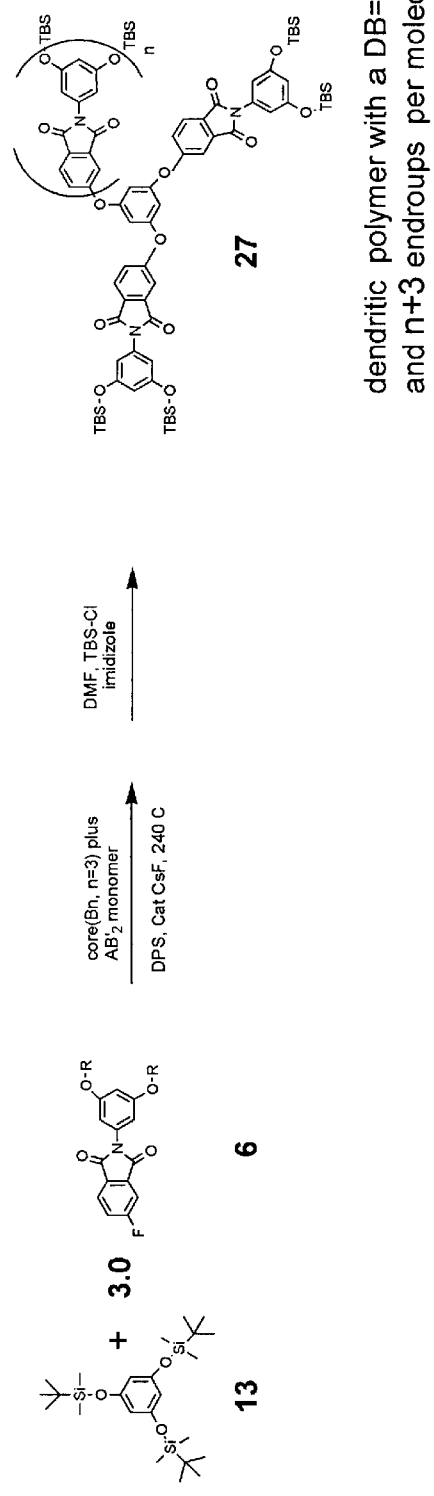
FIGURE 5A
dendritic polymerizations Bn core + AB'$_2$ monomer (DB=1.0)
FIGURE 5B
dendritic polymerizations Bn core + AB'$_2$ monomer (DB=1.0)

FIGURE 6A
schematic representaion of terminal (T), linear (L), and dendritic(D) building blocks of $AB_2$ type polymers and the mathematical expression used to determine the degree of branching

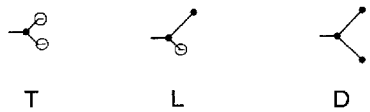

T     L     D $$DB = \frac{2(D)}{2(D) + L}$$

Holter, D.; Burgath, A.; Frey,H. *Acta Polym.* 1997, 48, 30-35.

FIGURE 6B
theoretical example of a linear $AB_2$ type polymer and calculation of its' degree of branching (DB)

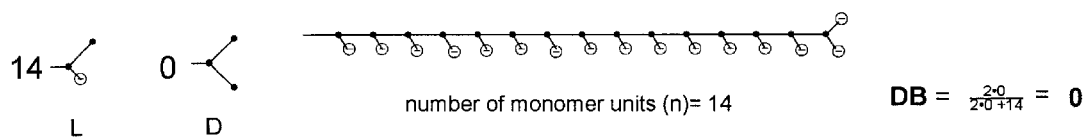

14 L     0 D     number of monomer units (n)= 14     $DB = \frac{2 \cdot 0}{2 \cdot 0 + 14} = 0$

FIGURE 6C
theoretical example of a hyperbranched $AB_2$ type polymer and calculation of its' degree of branching (DB)

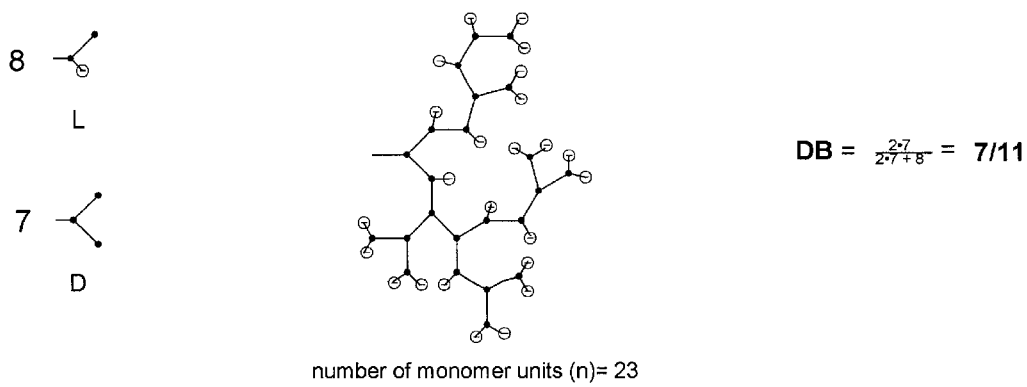

8 L

7 D $DB = \frac{2 \cdot 7}{2 \cdot 7 + 8} = 7/11$ number of monomer units (n)= 23

FIGURE 6D
Theoretical example of a dendritic $AB_2$ type polymer from $B_3$ core and calculation of its' degree of branching (DB) ($B_3$ core not included as a dendritic unit for calculation)

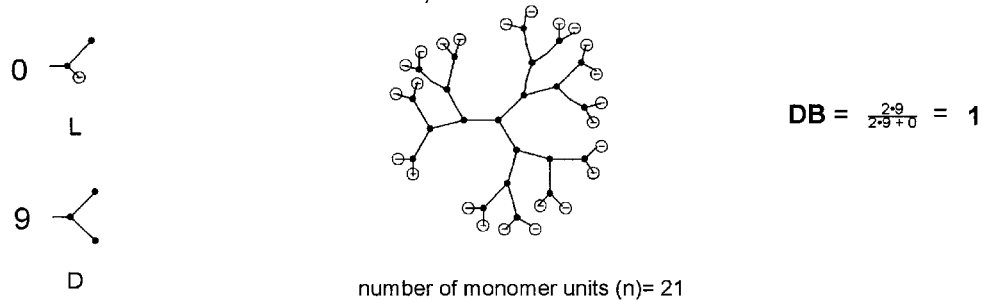

0 L

9 D $DB = \frac{2 \cdot 9}{2 \cdot 9 + 0} = 1$ number of monomer units (n)= 21

FIGURE 6E schematic representaion of dendritic [terminal (T), linear (L), and dendritic(D)] building blocks and linear [terminal (T) and linearl (L)] building blocks of $AB_2$ type polymers and the mathematical expression used to determine the degree of branching

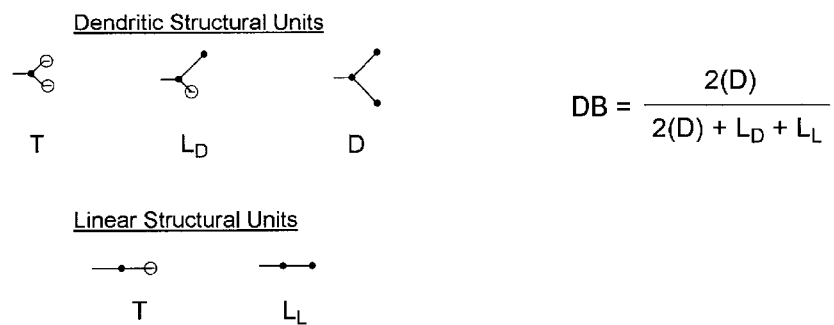

$$DB = \frac{2(D)}{2(D) + L_D + L_L}$$

FIGURE 6F theoretical example of a AB / $AB_2$ type branched copolymer and calculation of its' degree of branching (DB)

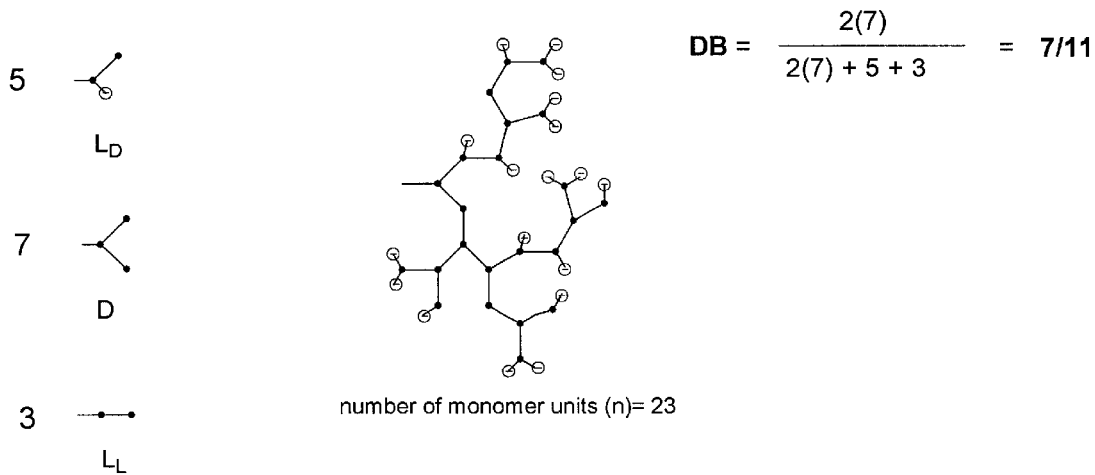

$$DB = \frac{2(7)}{2(7) + 5 + 3} = 7/11$$

number of monomer units (n)= 23

The synthesis of AB$_2$ monomer 4

Purity assessed by HPLC, elemental analysis, and NMR

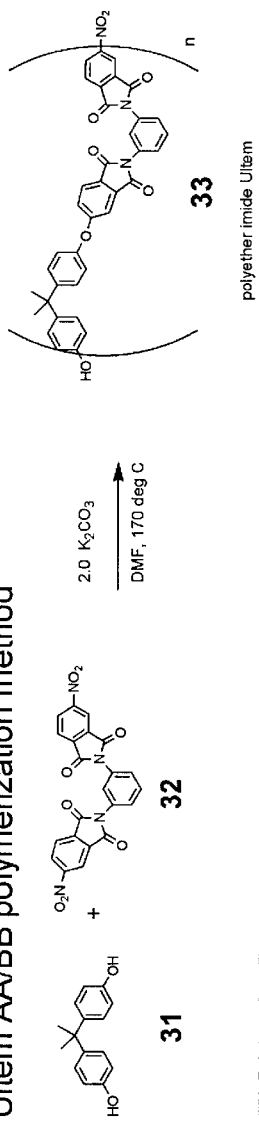
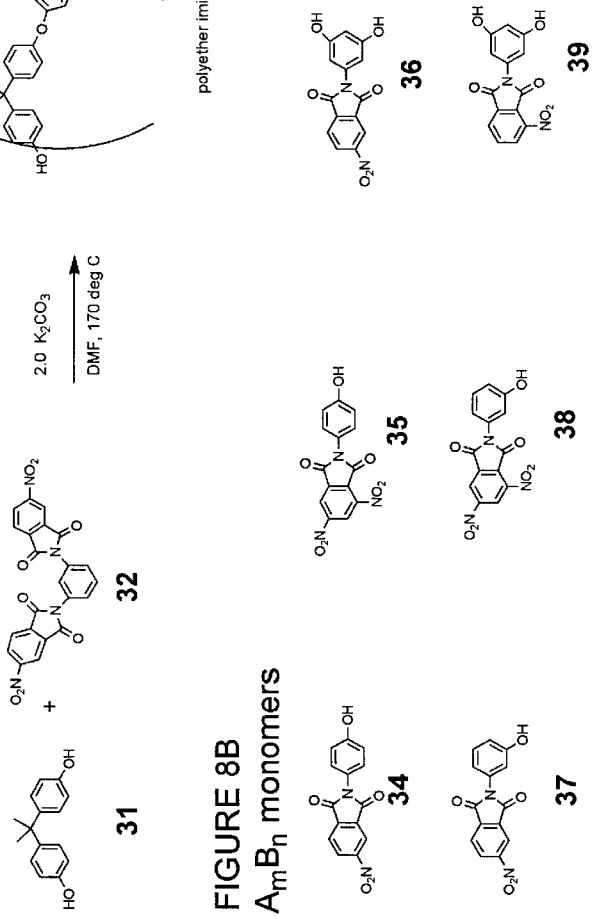
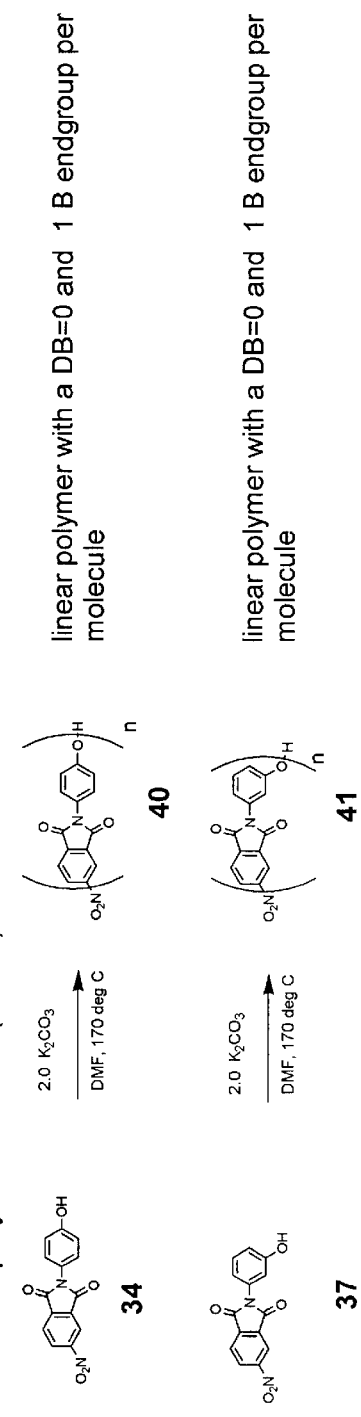
FIGURE 8A
Ultem AA/BB polymerization method
FIGURE 8B
$A_mB_n$ monomers
FIGURE 8C
Linear AB polymerizations (DB=0)

Synthesis of polyarylene ethers from bis(trialkylsilyl)ethers of bisphenols and activated bishalo compounds Synthesis of AB monomers AB monomers Linear AB polymerizations (DB=0)

Figure 11A. Schematic representation of a hyperbranched polymer with linear polymer endgroups

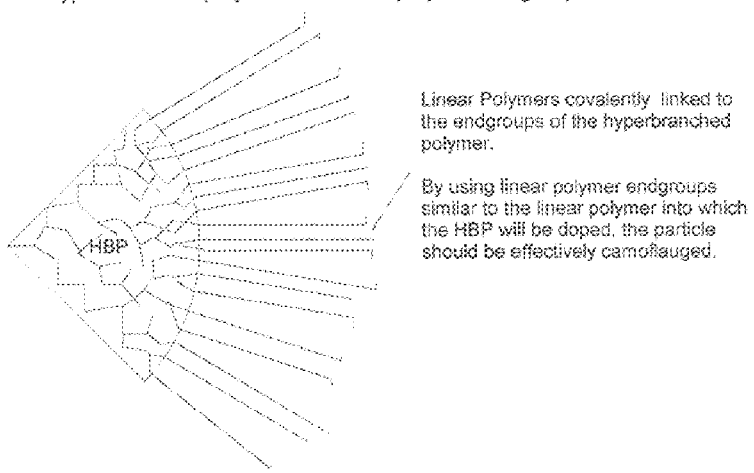

Linear Polymers covalently linked to the endgroups of the hyperbranched polymer.

By using linear polymer endgroups similar to the linear polymer into which the HBP will be doped, the particle should be effectively camoflauged.

Figure 11B. Incorporation of "stealth" hyperbranched particles into polymer melts, films, and composites of linear polymers could be used for toughening, efficient high density crosslinking agents, and rheological modifiers such as reducing melt viscoties.

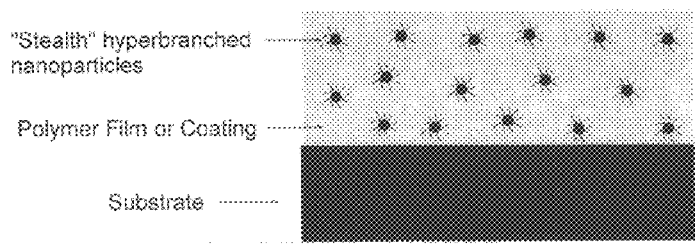

"Stealth" hyperbranched nanoparticles

Polymer Film or Coating

Substrate

Figure 12A: Selective phase separation and migration of hyperbranched particles to polymer film surfaces as a means of modifying surface properties
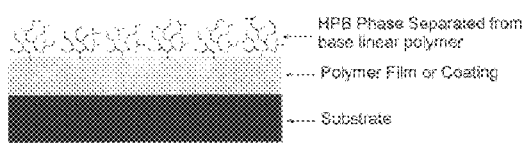
Figure 12B. Phase separation and migration occur under annealing due to an unfavorable free energy of mixing between the polymer film and the HBP "particles"
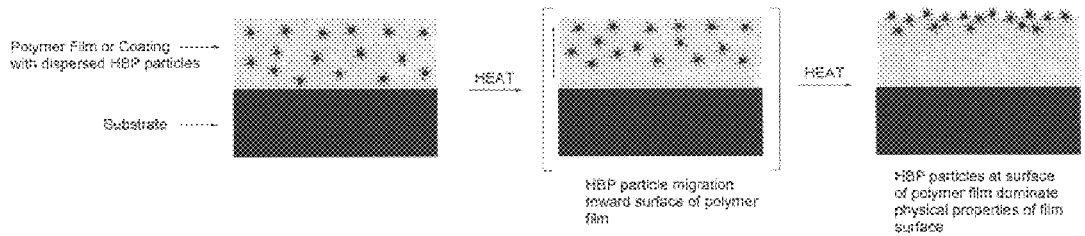

Figure 12C. Preliminary studies of the phase separation of two HBPs one with TBS endgroups and one with OCF3 endgroups in linear ULTEM performed. For films containing 5% by weight of the two end-group modified HBPs in ULTEM 1000 cast from chloroform and annealed at 290 Celsius in a nitrogen atmosphere, depth profiling Secondary Ion Mass Spectrometry (SIMS) measurements show that there is a high concentration of Silicon and Fluorine in the top 100 Angstroms of the film surfaces. This indicates that the above described process does occur and that hyperbranched materials can be used for modifying the surface properties of linear polymer films.

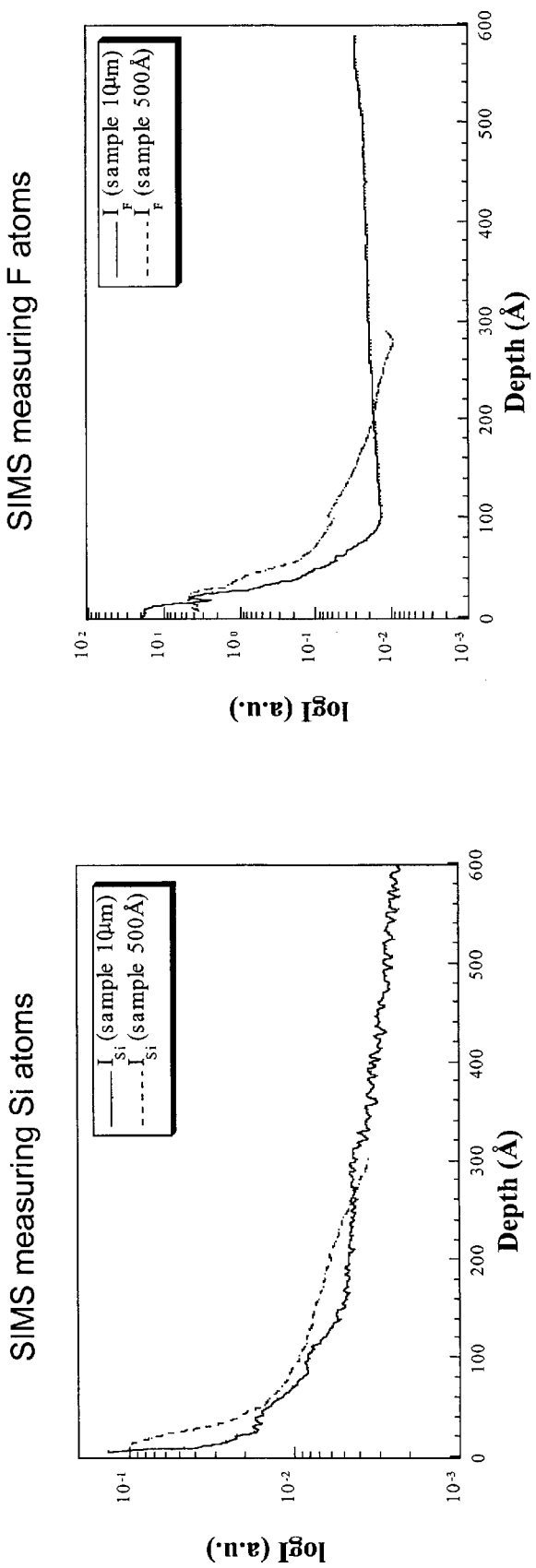

FIGURE 13: Thermal Gravimetric Analysis of AB linear polyetherimide 16 of the present invention
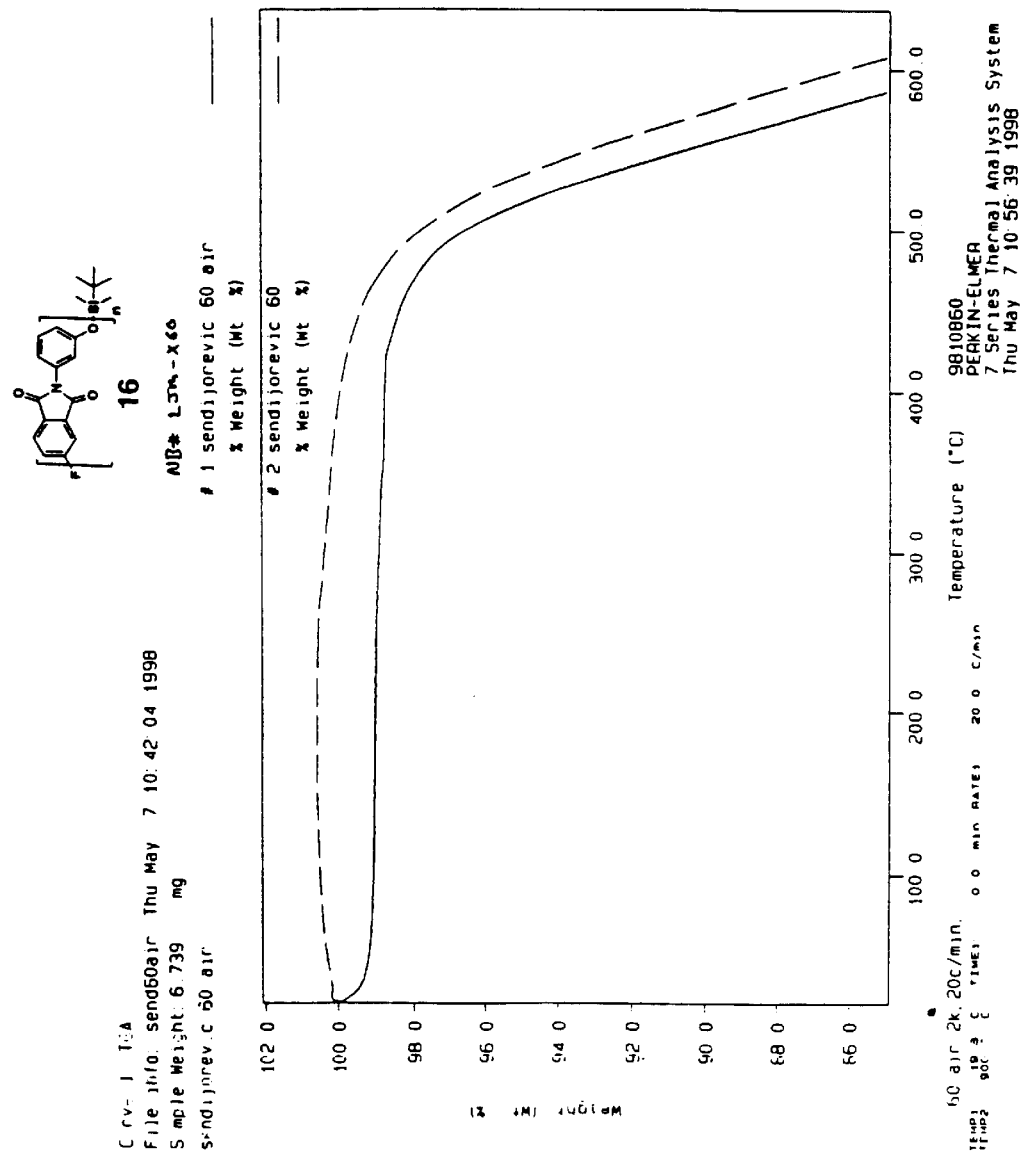

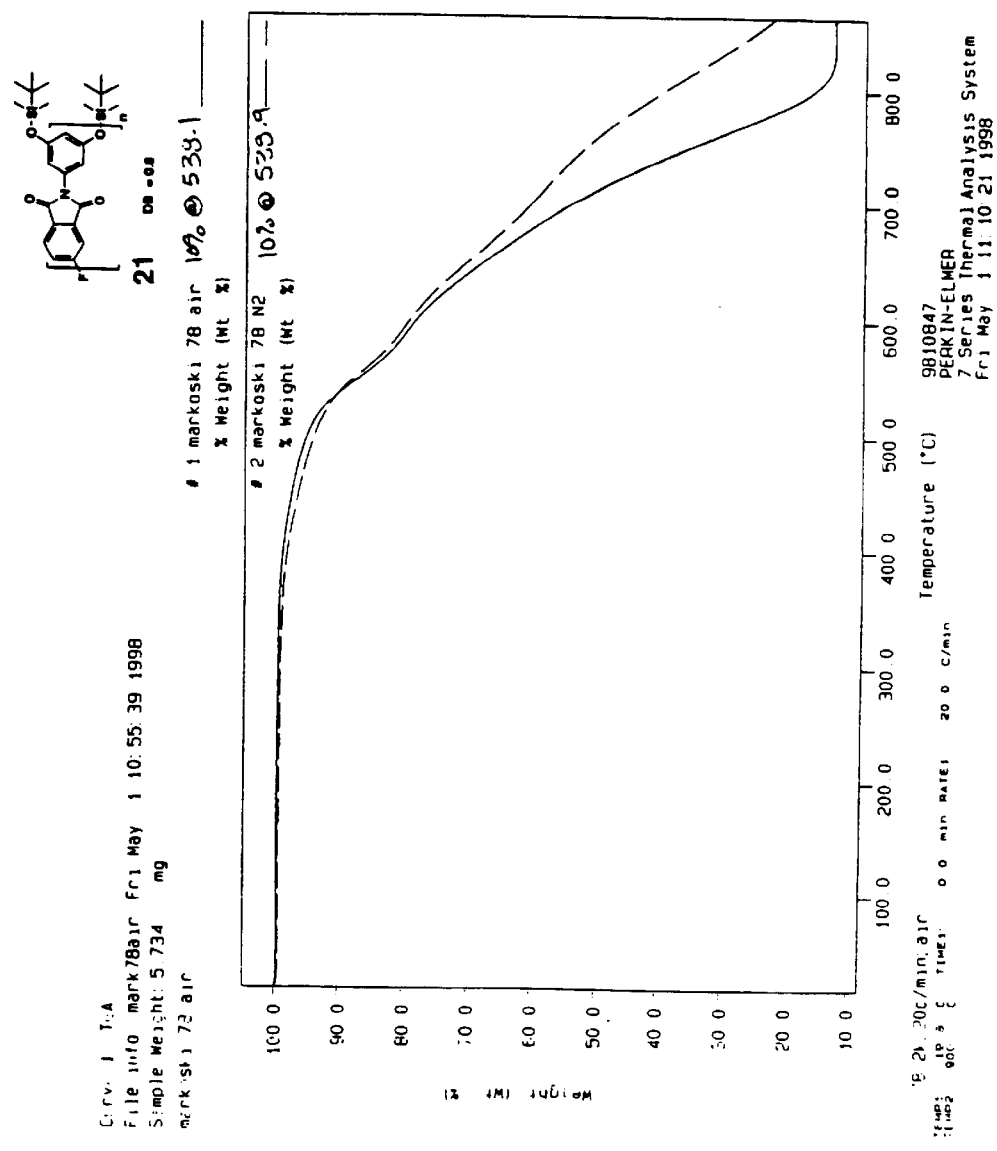
FIGURE 14: Thermal Gravimetric Analysis of AB$_2$ hyperbranched polyetherimide 21 of the present invention

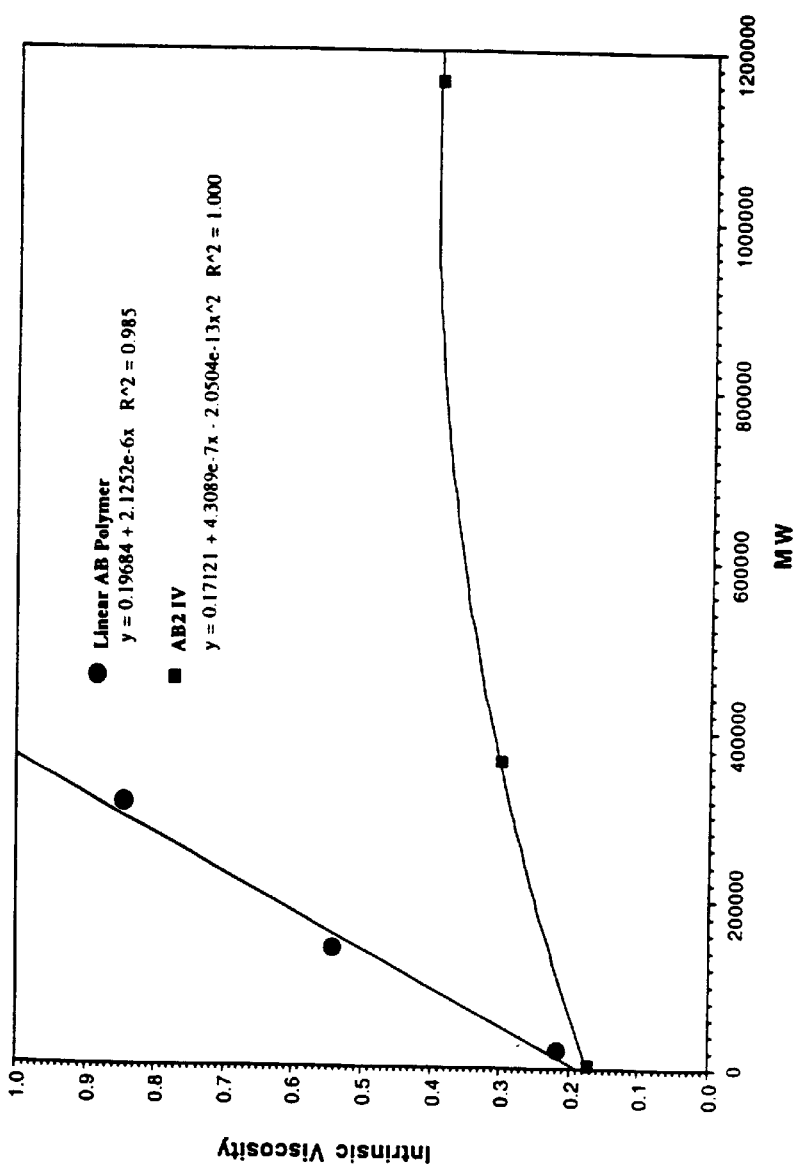
FIGURE 15: Plot of intrinsic viscosity (IV) versus molecular weight (MW) from GPC data of linear AB (16) and hyperbranched $AB_2$ (21) polyetherimides NMR determination of degree of branching for hyperbranched polyetherimide 21

A.) Model compound study to determine degree of branching in a one pot AB$_2$ polymerization These ratios were determined by actual physical recovery.

Model compound study to determine stability of silylethers

Synthesis of $A_mB_n$ monomers

Other $A_mB_n$ monomer examples

Other $A_mB_n$ polyetherimide example

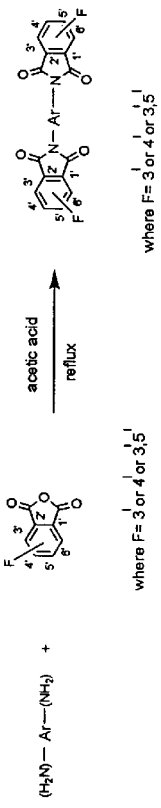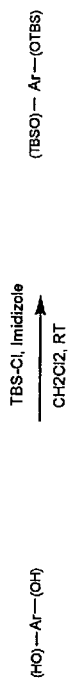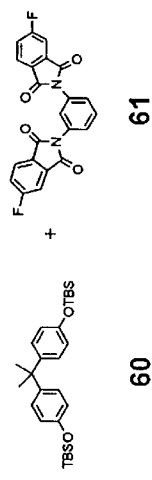
FIGURE 20A
Generic synthesis of AA monomers
FIGURE 20B
Generic synthesis BB monomers
FIGURE 20C
AA/BB monomer examples
FIGURE 20D
AA/BB polymerization example
linear polymer with a DB=0 and 1 B endgroup per molecule Generic synthesis of $B_n$ cores $B_n$ core examples

Synthesis of $A_m$ end-capping agents

Examples of $A_m$ end-capping agents

Synthesis of hyperbranched polyetherimide 73 from monomer 56

NMR analysis of DB of HBP 73

Thermal analysis of HBP 73

Figure 24

Table of thermal characterization data for AB / AB₂ copolymers 19

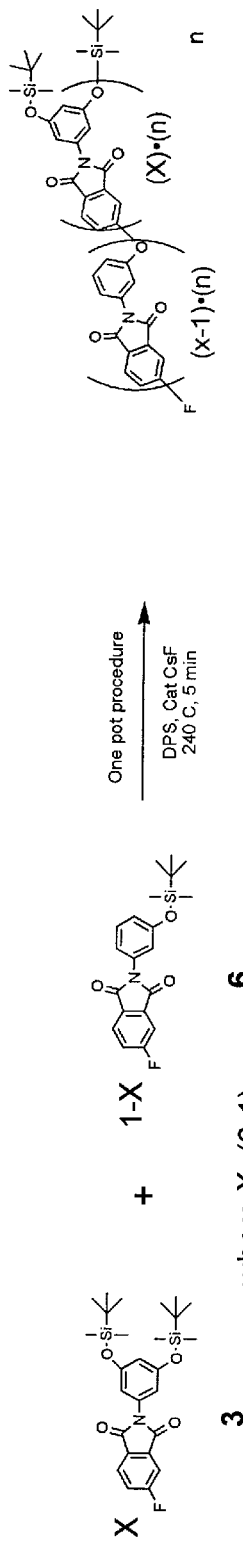

Branched random copolymer with a DB= 0.6 X and (X)•(n+1) B endroups per molecule

| PEI Copolymers % AB | Solubility† | | | | Thermal analysis (Deg °C) | | Molecular weight | | | Degree of Branching | |
|---|---|---|---|---|---|---|---|---|---|---|---|
| | Etoac | THF | DMF | DMAc | Tg | 10% wt loss | Mw | Mn | PDI | Theor.†† | Exper. |
| 0 | + | + | + | + | 183 | 515 | 50,925 | 14,925 | 3.41 | 0.50 | 0.67 |
| 25 | + | + | + | + | 182 | 550 | 84,350 | 15,625 | 5.4 | 0.49 | 0.69 |
| 50 | - | + | + | + | 202 | 547 | 132,200 | 14,225 | 9.29 | 0.44 | - |
| 75 | - | + | + | + | 199 | 557 | 125,050 | 13,475 | 9.28 | 0.32 | - |
| 85 | - | - | + | + | 199 | 560 | - | - | - | 0.23 | - |
| 90 | - | - | + | + | 210 | 577 | - | - | - | 0.17 | - |
| 92.5 | - | - | + | + | 209 | 552 | - | - | - | 0.13 | - |
| 95 | - | - | + | + | 212 | 574 | - | - | - | 0.09 | - |
| 100 | - | - | - | + | 212 | 582 | - | - | - | 0.00 | 0 |

† Solubility studies were performed by adding 20mg of polymer and 10ml of the corresponding solvent. (+) indicates that upon stirring overnight the solution was homogeneous giving a 2mg/ml solution. (-) indicates that upon stirring overnight the solution was either turbid or completely insoluble.
†† The theoretical DB was determined from Frey's definition for degree of branching where DB $_{AB/AB}$ = (2Pa)* (r+1) / (r+2)² with Pa=1 and r= [AB] / [AB₂]

Films of copolymers from Figure 24 cast from DMF and annealed at 150 °C for 1h

Films of copolymers from Figure 24 cast from DMF and annealed at 150 °C for 1h after scoring edge of film with razor blade

Figure 26

Plot of inherent viscosities of copolymers from Figure 24 in DMAc showing abrupt change in solution viscosity which closely relates to the transition from brittle to ductile films. The transition from brittle to ductile films (Figure 25B) and the sharp rise in solution viscosity define boundaries between which there are materials which have combinations of good properties and good processibility

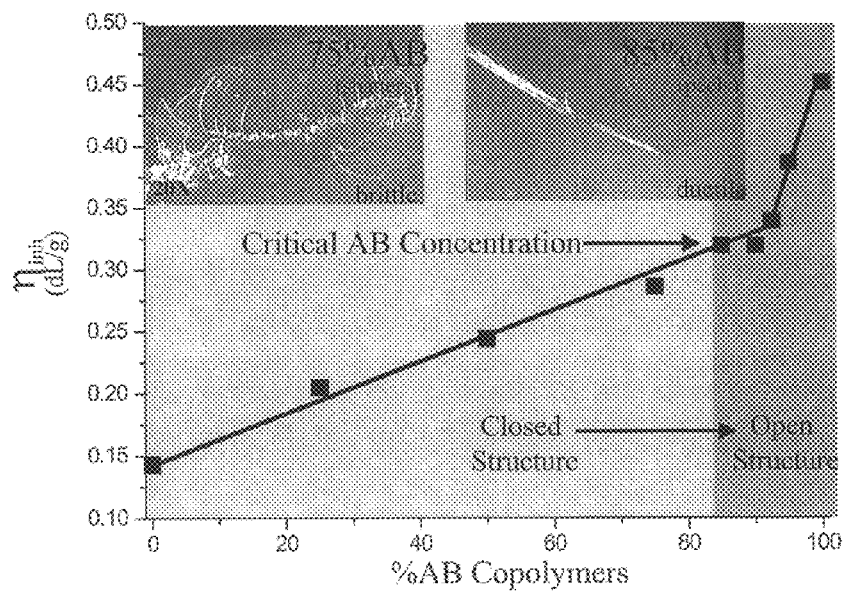

Figure 27
Comparison of Adhesion to polyethylene of octadecyloxy-terminated hyperbranched polymer 23A, poly(methyl methacrylate) (PMMA), polystyrene (PS), and Rhodamine dye

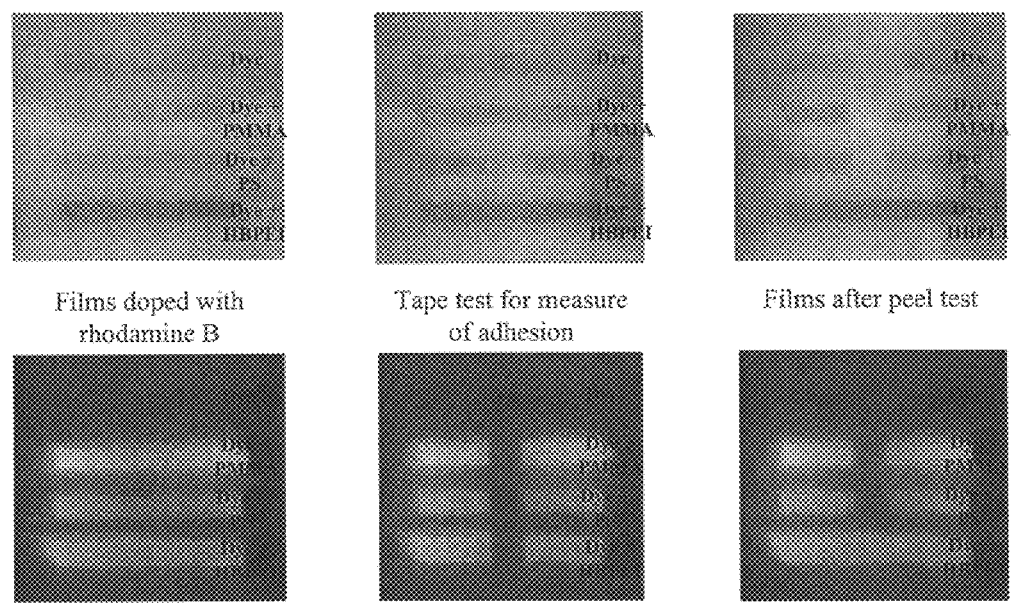

Films doped with rhodamine B

Tape test for measure of adhesion

Films after peel test

Films on polyethylene shown under normal light (top row) and under 254 nm UV light (bottom row).
Column 1 shows films patterned by a spray coating technique.
Column 2 shows films with the addition of a piece of scotch tape over all four patterned lines.
Column 3 shows the films following removal of tape at constant force. Of all of the films only the hyperbranched film remains adhered to the polypropylene

Figure 28A

Branched or hyperbranched polymeric structures which contain at least one etherimide branch point from the group comprising any of the following structures (a) at least one structural unit which is considered to be an etherimide branch point of an $A_1B_2$ type having at least one of the following structures

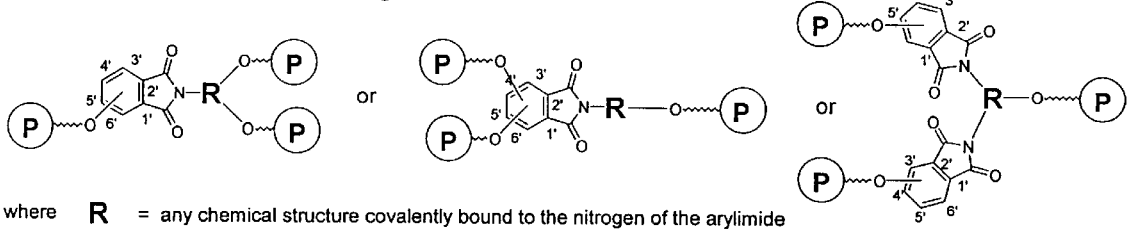

where   R  = any chemical structure covalently bound to the nitrogen of the arylimide
where   (P) = a polymeric structure covalently bound to the etherimide branch point (b) at least one structural unit which is considered to be an etherimide branch point of an $A_1B_3$ type having at least one of the following structures

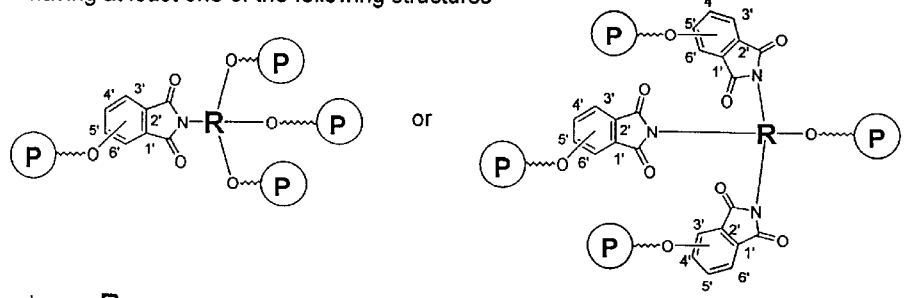

where   R  = any chemical structure covalently bound to the nitrogen of the arylimide
where   (P) = a polymeric structure covalently bound to the etherimide branch point (c) Structural units similar to those in (b) above and derived from $A_1B_n$ branch points (where n > 3)

Figure 28B

Branched or hyperbranched polymeric structures which contain at least one etherimide branch point from the group comprising any of the following structures (a) at least one structural unit which contains any aryl imide and is considered to be an etherimide branch point of an $A_1B_2$ type of which the naphthalimide structures below are an example having at least one of the following structures

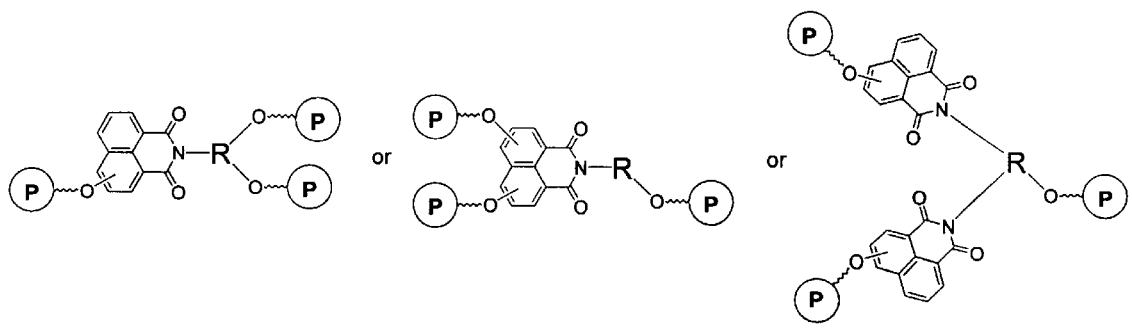

where R = any chemical structure covalently bound to the nitrogen of the arylimide where P = a polymeric structure covalently bound to the etherimide branch point (b) at least one structural unit which contains any aryl imide and is considered to be an etherimide branch point of an $A_1B_2$ type and of which the naphthalimide structures below are an example having at least one of the following structures

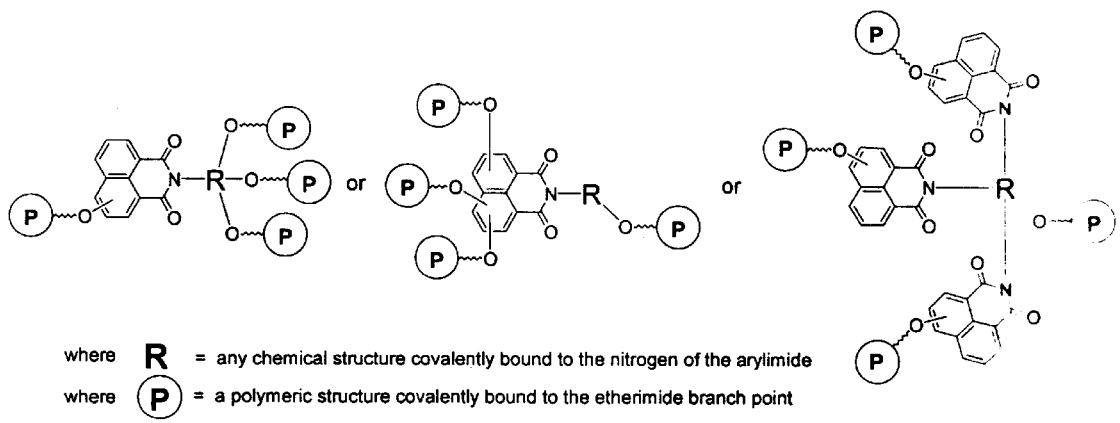

where R = any chemical structure covalently bound to the nitrogen of the arylimide where P = a polymeric structure covalently bound to the etherimide branch point (c) Structural units similar to those in (b) above and derived from $A_1B_n$ branch points (where n > 3)

BRANCHED AND HYPERBRANCHED POLYETHERIMIDES

CROSS REFERENCE TO RELATED APPLICATION

This is an application under 35 U.S.C. Section 119(e) based upon a previously filed provisional application, Serial No. 60/107,244 filed Nov. 5, 1998, which is incorporated herewith by reference, and which is co-pending, and which is believed to disclose adequately and sufficiently subject matter claimed herein.

This invention was made with Government support under Contract Nos. DAAG55-97-1-0126 awarded by the Department of the Army. The Government may have certain rights in the invention.

FIELD OF THE INVENTION

The invention involves branched and hyperbranched polyetherimides from stable $A_1B_n$ (where $n \geq 2$), AB, AA, and BB monomers; $A_m$ end-capping agents (where m=1); $B_n$ cores (where $n \geq 1$) and combinations thereof; with controllable degrees of branching (DB=0–1), molecular architectures, end-group compositions, along with methods for their preparation. More specifically, the present invention relates to stable $A_mB_n$ monomers (as shown generally in FIG. 1A, and more particularly in FIG. 1B) and methods for making them, as well as using those monomers in methods for producing stable polyetherimides (PEIs), including high molecular weight star PEIs (as shown in FIG. 2A), linear PEIs (as shown in FIG. 2B), hyperbranched PEIs (as shown FIGS. 3A, 3B, 4A, 4B, and 4C), and dendritic PEIs (as shown in FIGS. 5A and 5B). The stable PEIs of the present invention have advantageous and unique properties never attained by prior compounds. More specifically, the present invention provides compounds that have high solubility and low viscosity, and which are thermally and chemically stable. Thus, the stable compounds of the present invention can be used for many products a wide variety of applications, including but not limited to, coatings, electronic encapsulation, and injection molding processes. The present invention can be used for many products including but not limited to wire enamels, sterilizable medical equipment, computer chip products, and aircraft engine parts.

BACKGROUND OF THE INVENTION

Those of skill in the art to which this invention pertains will recognize the typical terminology used in the art. As a convenience for others whom may not be of skill in the art, the following description is provided so that they can better appreciate the limited nature of the prior art and advantages and importance of the present invention.

The term that describes or quantifies the branched nature of a polymer is called the degree of branching ("DB"). FIG. 6A is a schematic representation of terminal (T), linear (L), and dendritic (D) building blocks of $AB_2$ type polymers. Polymers having a degree of branching approaching 0 are said to be linear (e.g., as shown in FIG. 6B) and those having a degree of branching approaching 1 are said to be dendritic (e.g., as shown FIG. 6D) or "maximally" branched. Anything in between these two extremes is said to be branched or hyperbranched depending upon the degree of branching (e.g., as shown in FIG. 6C). The formula that determines the degree of branching for the one-pot polymerization of an $AB_2$ type monomer is given below:

$$DB = \frac{2[D_{AB_2}]}{2[D_{AB_2}] + [L_{AB_2}]} \quad (1)$$

In equation 1 above, $[D_{AB_2}]$ and $[L_{AB_2}]$ represent mole fractions of dendritic and linear segments, that are incorporated into the polymeric backbone. See Holter D., Burgath A., Frey H., *Acta Polymer* 48, 30–35 (1997). The equation that determines the degree of branching for the one-pot polymerization of an $AB/AB_2$ type polymerizations is given below:

$$DB_{Frey} = \frac{2[D_{AB_2}]}{2[D_{AB_2}] + \{L_{AB_2}\} + [L_{AB}]} \quad (2)$$

In equation 2, $[D_{AB_2}]$, $[L_{AB_2}]$ and $[L_{AB}]$ represent mole fractions of dendritic and linear segments (FIG. 6E), respectively. See Frey, H.; Hölter, D., *Acta Polymerica* 1999, 50(2–3), 67–76.

The physical properties of the polymers are determined by the size, shape, and peripheral chemistry (endgroups/B groups) of the polymer. The physical properties (e.g., crystallinity, solution viscosity and solubility) of dendritic macromolecules have been shown to be drastically different from their linear counterparts. See Hawker C. J.; Malmstrom E. E.; Frank C. W., Kampf J. P., *Journal of the American Chemical Society*, 1997, 119, 9903–9904; and Frechet J.; Hawker C. J.; Gitson I.; Leon J. W., *Journal of Material Science*-Pure Applied Chemistry 1996 A33(10), 1399–1425. The reason for this is believed to be that dendrimers are discrete molecules whose physical properties are determined by their unique globular shape (lack of intermolecular interactions) and the number of endgroups that occupy their periphery. This is in direct contrast to linear polymers whose physical properties are determined by chain entanglements (intermolecular interactions) and the structure of the repeat unit.

Linear Polymers in General

The majority of products in the plastics industry consist of linear polymers. This linear nature affords diverse physical and mechanical properties. The physical properties of linear polymers are highly dependent on molecular weight. Two examples of such properties are solubility and viscosity. As the molecular weight increases, the viscosity of the material increases. This can be a beneficial property if a viscous material is desired, but in many industrial processes, e.g., where injection molding is the processing method of choice, extremely viscous materials slow down the process and viscosity can become a limiting step of production. Also, as the molecular weight increases, the solubility decreases. If solubility resistance is the desired trait, then this is a suitable outcome. However, in other applications, e.g., the manufacture of coatings or films from liquids, low solubility leads to difficult manufacturing problems.

Thus, there is a need for materials that have much lower viscosity and much higher solubility than linear compounds, yet still retain the advantageous properties of linear compounds. These properties would make such materials ideal commercial candidates for use as additives or property modifiers for commercial coatings and injection molding processes, and thus useful in large volume industrial applications.

Dendritic Polymers in General

Dendrimers are "perfect," or maximally branched macromolecules that have drawn considerable attention in the last few years. See Frechet J.; Hawker C. J.; Gitson I.; Leon J. W., *Journal of Material Science*-Pure Applied Chemistry 1996 A33(10), 1399–1425; and Kim Y. H., *Journal of Polymer Science* 1998, 36, 1685–1689. From a materials standpoint, dendrimers have extremely useful properties, such as increased solubility and reduced viscosity at high molecular weights. However, attempts to make dendrimers have resulted in materials whose synthesis is extremely expensive, time consuming, and labor intensive (e.g., extremely difficult to purify).

Hyperbranched Polymers in General

The synthesis of hyperbranched polymers is an area of research that was discussed as early as 1952. See Flory P. J., *J. Am. Chem. Soc.* 1952, 74, 2718. More recently, interest in hyperbranched polymers has increased due to their possible use as alternatives to dendrimers. See Frechet J.; Hawker C. J.; Gitson I.; Leon J. W., *Journal of Material Science*-Pure Applied Chemistry 1996, A33(10), 1399–1425; and Kim Y. H., *Journal of Polymer Science* 1998, 36, 1685–1689. Thus far however, attempts to synthesize monomers necessary to make hyperbranched polymers have been costly and difficult, leading to the limited production of monomeric starting materials. The lack of available monomeric starting materials has slowed the bulk property testing of the hyperbranched polymers that could make them viable candidates for commercial applications. Nonetheless, much effort has been given to solve this problem and researchers have been trying to develop new methods and materials that utilize the hyperbranched approach to make cost-efficient, scalable hyperbranched polymers that mimic dendrimers, as evidenced by Frechet J.; Hawker C. J.; Gitson I.; Leon J. W.; *Journal of Material Science*-Pure Applied Chemistry 1998, A33(10), 1399–1425; Kim Y. H., *Journal of Polymer Science* 1998, 36, 1685–1689; and the United States Government Report (NIST) entitled "Workshop on Properties and Applications of Dendritic Polymers: Speaker Abstracts: Literature Review on Characterization, Modeling, and Applications" (July 9–10, 1998).

Moreover, to the extent that scalable quantities of monomers have been made, many of the hyperbranched polymers made from these monomers may not withstand severe chemical, mechanical, thermal and oxidative conditions. Thus, there is a great need for stable monomers and hyperbranched polymers, as well as convenient and cost efficient methods for their manufacture.

Polyetherimide Formation

Formation of an aromatic ether bond in an imide system via a nucleophilic aromatic substitution reaction can be done a number of ways. Typically (FIG. 8A), one takes an aromatic nitrophthalimide monomer 32 and reacts it with a bisphenolate salt monomer 31 in a high boiling polar aprotic solvents such as dimethylformamide ("DMF") or n-methylpyrrolidinone ("NMP") to produce high molecular weight ("MW") polymer. See White D. M.; Takekoshi T., *Journal of Polymer Science* 1981, 19, 1635–1658. The polymer 33 shown in FIG. 8A is a polyetherimide that is produced on commercial scale under the tradename Ultem® by General Electric Company. One of the problems with this synthesis is that in order to achieve high MW polymer, perfect stoichiometric ratios of the AA and BB monomers must be used and the conditions require strict adherence to anhydrous and oxygen free conditions which is difficult to achieve. Extrapolating from this chemistry, one can envision that monomers 34–39 could be synthesized. In U.S. Pat. No. 4,297,474, monomers 34 and 37 were synthesized and polymerized, but led to low molecular weight linear polymers 40 and 41. Monomers 35 and 38 could be synthesized to make hyperbranched PEIs, but it has been shown that the reaction rate of the 3- versus the 5-nitro is five (5) times lower, which in a one-pot polymerization procedure would lead to a polymer with a very low degree of branching. See Gosh M. K.; Mittal K. L.; *Polyimides*, Marcel Dekker, Inc., New York, N.Y., 1996; and Holter D., Frey H.,*Acta Polymer* 1997, 48, 298–309. Further, the material would behave more like a linear polymer, have endgroups which would lead to decreased solubility of the homopolymer, and would be difficult to chemically derivatize. On the other hand, monomers 36 and 39 could be synthesized as well, but it has been previously shown that the chemistry doesn't work well when both phenols are on the same aromatic ring. See White D. M.; Takekoshi T., *Journal of Polymer Science* 1981, 19, 1635–1658. An electron transfer redox reaction occurs between electron-rich benzenediol dianions and highly electron deficient nitrophthalimides, thereby leading to low molecular weight polymers. See Gosh M. K.; Mittal K. L., *Polyimides*, Marcel Dekker, Inc., New York, N.Y., 1996.

More recently, Kricheldorf developed a catalytic method for nucleophilic aromatic substitution polymerization. See Gosh M. K., Mittal K. L., *Polyimides*, Marcel Dekker, Inc., New York, N.Y., 1996. In this scheme (FIG. 9), activated aromatic bishalo compounds (AA monomers) in the presence of a fluoride catalysts were reacted with bis(silylether)s of bisphenols (BB monomers) in place of bisphenol salts. The silyl ether is converted in situ to the corresponding phenoxide. The phenoxide undergoes substitution reaction, producing the polyarylethers and regenerating the halide anion. The volatile trisalkylsilylhalide by-product, boils off, driving the equilibrium toward high MW polymer. This procedure does not require preparation of oxygen-sensitive anhydrous bisphenol salts or the removal of the salt byproduct. Since the reaction takes place only at high temperature and in the presence of catalyst, it is contemplated that both functionalities could be placed on the same monomer creating an AB monomer. This would be advantageous from a polymerization standpoint since exact stoichiometric balance is assured in the monomer unit.

Bryant and St. Clair (FIGS. 10A–C) have employed the above process for the synthesis of AB-type polyetherimides monomers 42–45 and polymers 46 thereof, similar to that shown in FIG. 8A. See Bryant R. G., St. Clair T. L., *Abstracts of the 4th International Conference on Polyimides*, October/November 1991, Ellenville, N.Y., II-69. The inventors of the current invention followed this teaching of Bryant and St. Clair to make AB monomer 42 and 44 and found that the resulting monomers were unstable which led to polymers of low molecular weight. Therefore, stable monomers that could be purified to 99+% were not taught by conventional methods.

SUMMARY OF THE INVENTION

In the broadest sense, the invention includes all branched or hyperbranched polymeric structures which contain at least one etherimide branch point, more specifically from stable $A_1B_n$ (where $n \geq 2$), AB, AA, and BB monomers; $A_m$ end-capping agents (where m=1); $B_n$ cores (where $n \geq 1$) and combinations thereof; with controllable degrees of branching (DB=0–1), molecular architectures, end-group compositions, along with methods for their preparation.

The present invention overcomes the shortcomings of the prior art. The stable monomers of the present invention provide a chemistry that can be controlled to produce processible, highly branched, high molecular weight (MW) polymers that are mechanically, thermally, and hydrolitically stable as well as being resistant to oxidative degradation. More specifically, the present invention provides methods for making stable monomers that can be polymerized into stable hyperbranched polymers of any desired shape, size, and degree of branching between that of a linear and dendritic polymer, and which have endgroups that can be easily removed or modified as desired. Thus, the present invention provides methods for making new, custom-made materials and products.

The invention relates to stable $A_mB_n$ monomers (where m=1 and n≧1), comprising the steps of reacting an amino-phenol or an amino-diphenol and with an aromatic anhydride using heat and in the presence of acetic acid to produce an arylimide, and mixing the resulting arylimide with a silyl electrophile and an base in the presence of an organic solvent, wherein the silyl electrophile has the structure:

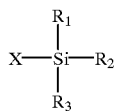

where either $R_1$, $R_2$, or $R_3$ or all ($R_1$, $R_2$, and $R_3$) have more than one carbon atom when m=1 and n=1, or $R_1$, $R_2$, or $R_3$ have one carbon atom or more when m=1 and n>1 and X is a leaving group.

The methods of the present invention minimize the cost of making stable monomers by utilizing only three (3) steps and readily available, relatively inexpensive starting materials. (See e.g., FIG. 7).

The present invention comprises new products, processes, intermediates and compositions of matter. The novel chemical methods can be and have been extended to other aromatic polyetherimide monomers and polymers (see FIGS. 19A–C and 20A–D) which can be used to create other linear, branched, star, and hyperbranched polyetherimide polymers as desired.

The methods of the present invention provide for the manufacture of large amounts of material, with the ability to control the physical properties of the polymers by controlling the size, shape, and peripheral chemistry. Further, no column chromatographic separations are required in the present invention, thereby eliminating expensive and difficult processing associated with such separations.

Due to the unique properties of the products of the present invention, the branched and hyperbranched polymers of the present invention can be used in a wide variety of applications, including but not limited to, coatings, electronic encapsulation, and injection molding processes. The present invention can be used for many products including but not limited to wire enamels, sterilizable medical equipment, computer chip products, and aircraft engine parts. The branched and hyperbranched polymers can be used as additives to other polymers for modification of surface properties as desired.

BRIEF DESCRIPTION OF THE DRAWINGS

FIGS. 3A and 3B illustrate synthesis of stable hyperbranched PEIs 19 and 20 (DB=0–0.6) of the present invention via AB/AB'B/AB$_2$ co-polymerization.

FIG. 3C illustrates the definition of the repeat unit designation that is used throughout the specification.

FIGS. 4A, 4B, and 4C illustrate synthesis of stable hyperbranched PEIs 21, 22, 23, 23A, and 25 (DB=0–0.6) of the present invention via AB$_2$ polymerization.

FIGS. 5A and 5B illustrate synthesis of stable dendritic PEIs 26 and 27 (DB=1.0) of the present invention via dendritic polymerization of a $B_n$ core and an AB'$_2$ monomer.

FIG. 6A is a schematic representation of terminal (T), linear (L), and dendritic (D) building blocks of AB$_2$ type polymers.

FIG. 6B is a schematic representation of a linear AB$_2$ type polymer (DB=0) having a total of fourteen (14) monomer units.

FIG. 6C illustrates a hyperbranched AB$_2$ type polymer (DB=7/11) having a total of twenty-three (23) monomer units.

FIG. 6D illustrates a dendritic AB$_2$ type polymer (DB=1.0) from B$_3$ core having a total number of twenty-one (21) monomer units.

FIG. 6E is a schematic representation of terminal ($T_{AB2}$), linear ($L_{AB2}$), dendritic ($D_{AB2}$), terminal ($T_{AB}$), and linear ($L_{AB}$) building blocks of AB/AB$_2$ type polymers.

FIG. 6F illustrates a branched AB/AB$_2$ type polymer (DB=7/11) having a total of twenty-three (23) monomer units.

FIG. 8A illustrates the AA/BB polymerization of a commercially available polymer 33 (Ultem®), using compounds 31 and 32.

FIG. 8B illustrates $A_mB_n$ monomers 34 through 39 that can be synthesized by extrapolating from the chemistry shown in FIG. 8A.

FIG. 8C illustrates AB polymerizations (DB=0) of low molecular weight linear polymers 40 and 41 from $A_mB_n$ monomers 34 and 37, respectively.

FIG. 11A illustrates linear polymers covalently linked to the endgroups of a hyperbranched polymer.

FIG. 11B illustrates "stealth" hyperbranched nanoparticles in a polymer film or coating on a substrate which may be used to modify the bulk properties of the parent polymer.

FIGS. 12A and 12B illustrate selective phase separation and migration of hyperbranched particles to polymer film surfaces as a means of modifying surface properties.

FIG. 12C illustrates preliminary studies of phase separation of tert-butyl dimethyl silylchloride ("TBS") terminated hyperbranched polymers ("HBP") and linear Ultem®.

FIG. 13 illustrates a thermal gravimetric analysis of AB linear polyetherimide 16 of the present invention.

FIG. 14 illustrates a thermal gravimetric analysis of $AB_2$ hyperbranched polyetherimide 21 of the present invention.

FIG. 15 illustrates the intrinsic viscosity versus molecular weight (MW) from gel permeation chromatography (GPC) data of linear AB polyetherimide 16 and the hyperbranched $AB_2$ polyetherimide 21 of the present invention.

FIG. 20A illustrates the synthesis of AA monomers.

FIG. 20B illustrates the synthesis of BB monomers.

FIG. 20C illustrates AA/BB monomers 60 and 61.

FIG. 20D illustrates AA/BB polymerization of compounds 60 and 61 to make linear polymer 62 (DB=0 and 1B endgroup per molecule).

FIG. 24 illustrates thermal analysis, and other properties, of a series $AB/AB_2$ branched polymers with the generic structure of polymer 19.

FIG. 26 illustrates the inherent viscosity behavior of a series $AB/AB_2$ branched polymers with the generic structure of polymer 19 (FIG. 24) as synthesized in FIG. 3A.

FIG. 27 illustrates the adhesion behavior of an octadecyloxy-terminated hyperbranched polymer of the generic structure 23A as synthesized in FIG. 4B as compared to commercially available poly(methyl methacrylate) polystyrene, and Rhodamine dye to a polyethylene substrate.

FIGS. 28A and 28B illustrate the general schematic description of the branched and hyperbranched polymeric structure of the present invention which contains at least one etherimide branch point from the group comprising any of the following structures shown therein (and also as claimed in claim 1).

DESCRIPTION OF PREFERRED EMBODIMENTS

The following is a description of preferred embodiments of the present invention. Those of skill in the art will recognize various modifications to these preferred embodiments and that such modifications are within the scope of the claims following this description.

FIGS. 28A and 28B illustrate the general schematic description of the branched and hyperbranched polymeric structure of the present invention which contains at least one etherimide branch point from the group comprising any of the following structures shown therein (and also as claimed in claim 1. The arylimide structure can be an $A_1B_n$ naphthalimide structure shown in FIG. 28B.

Figure 1A:
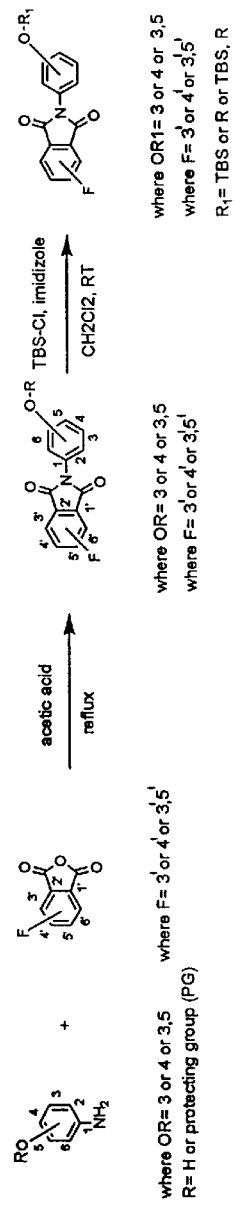
FIG. 1A illustrates the synthesis of stable $A_mB_n$ monomers of the present invention.

FIG. 1A illustrates the synthesis of stable $A_mB_n$ monomers of the present invention. More specifically, the synthesis involves reacting an amino-phenol and an aromatic anhydride using heat in the presence of acetic acid to produce an arylimide and mixing the arylimide with a silyl electrophile and a base in the presence of an organic solvent, wherein the silyl electrophile has the structure

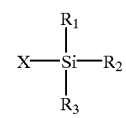

where either $R_1$, $R_2$, or $R_3$ or all ($R_1$, $R_2$, and $R_3$) have more than one carbon atom when m=1 and n=1, or $R_1$, $R_2$, or $R_3$ have one carbon atom or more when m=1 and n>1 and X is a leaving group.

The amino-phenol can be any suitable amino-phenol, such as 4-amino-phenol. In a preferred embodiment of the invention, the amino-phenol is an amino-di-phenol having the structure

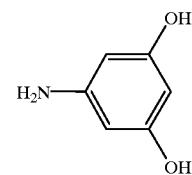

Similarly, the aromatic anhydride can be any suitable aromatic anhydride. In a preferred embodiment of the present invention, the aromatic anhydride is 4-fluorophthalic anhydride.

Also, the silyl electrophile can be any suitable silyl electrophile. In a preferred embodiment of the present invention, the silyl electrophile is tert-butyl dimethyl silylchloride ("TBS-Cl"), the base is imidazole, and the organic solvent is dichloromethane.

Figure 1B:
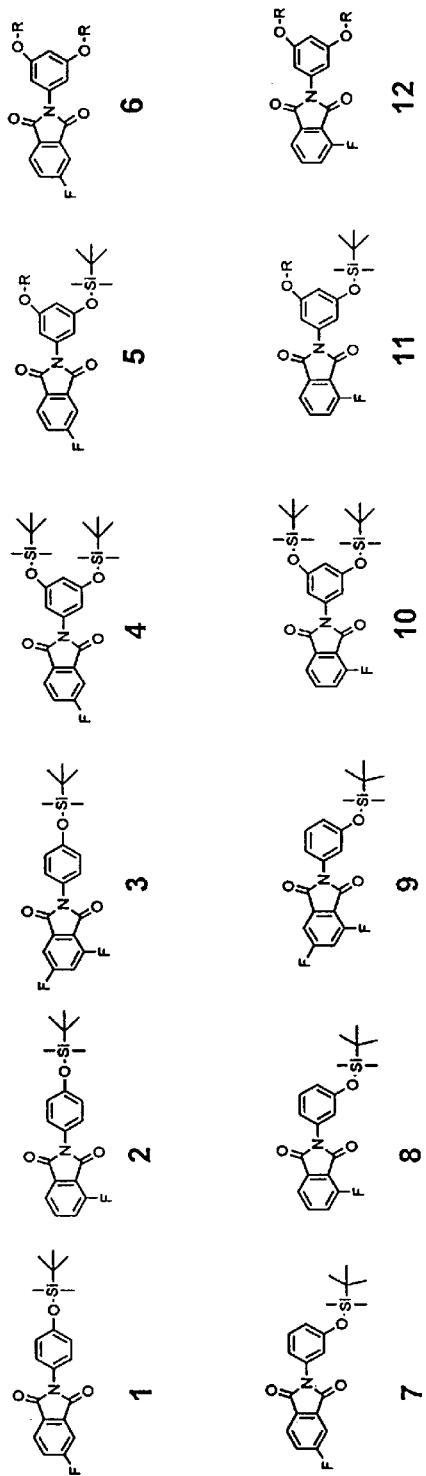
FIG. 1B illustrates specific stable $A_mB_n$ monomers 1 through 12 of the present invention.

FIG. 1B illustrates specific stable $A_mB_n$ monomers 1 through 12 of the present invention. Any of these stable $A_mB_n$ monomers can be made by using the corresponding amino-phenol and aromatic anhydride starting materials. Stable $A_mB_n$ monomers 1, 4, 7 and 10 were made in accordance with the present invention. Stable $A_mB_n$ monomer 4 is a preferred monomer of the present invention. The R groups shown in monomers 5, 6, 11 and 12 can be hydrogen, heteroatom, or carbon-based groups.

Figure 2A:
FIG. 2A illustrates the synthesis of stable high molecular weight star PEI 14 of the present invention using a $B_n$ core 13 and AB monomer 7.

FIG. 2A illustrates the synthesis of stable high molecular weight star PEI 14 of the present invention using a $B_n$ core 13 and AB monomer 7. In this example, $B_n$ core 13 (where n=3) and AB monomer 7 are reacted in the presence of diphenyl sulphone ("DPS") and cesium flouride catalyst ("CsF") at about 240 degrees Centigrade for about 5 minutes. The resulting star polymer has three (3) B endgroups per molecule.

In accordance with the present invention as disclosed throughout this specification, those skilled in the art will recognize that other suitable catalysts can be used, including but not limited to fluoride catalysts like sodium fluoride and/or potassium fluoride. Those skilled in the art will also recognize that other high temperature solvents can be used, including but not limited to, benzophenone. Those skilled in the art will further recognize that the time of the reaction can be varied to achieve the desired polymerization, and will typically be about 2.5–20 minutes, and preferably about 2.5–5.0 minutes.

Figure 2B:
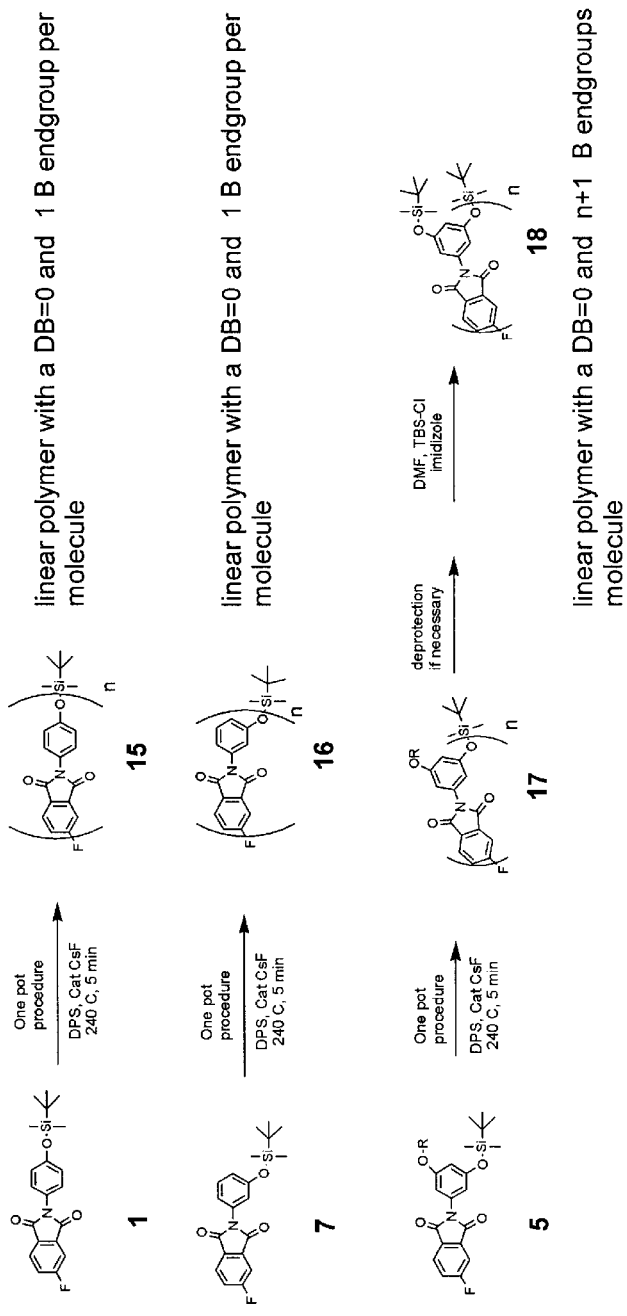
FIG. 2B illustrates the synthesis of stable linear PEIs 15 through 18 (DB=0) of the present invention via linear AB polymerization.

FIG. 2B illustrates the synthesis of stable linear PEIs 15 through 18 (DB=0) of the present invention via linear AB polymerization. Stable linear PEIs 15 and 16 were made from stable $A_mB_n$ monomers 1 and 7, respectively, each in a one pot procedure wherein each stable $A_mB_n$ monomer was reacted in the presence of diphenyl sulphone ("DPS") and cesium flouride catalyst ("CsF") at about 240 degrees Centigrade for 5 minutes. Stable linear PEI 18 can be similarly made from stable $A_mB_n$ monomer 5 to yield PEI 17, and then if deprotection is necessary, to use dimethylformamide ("DMF"), TBS-Cl, and imidazole to yield PEI 18. PEI 18 is a linear polymer with a DB=0 and n+1 B endgroups per molecule.

FIGS. 3A and 3B illustrate synthesis of stable hyperbranched PEIs 19 and 20 (DB=0–0.6) of the present invention via AB/AB$_2$ co-polymerization of stable $A_mB_n$ monomers 4 and 7, or co-polymerization of stable $A_mB_n$ monomers 4 and 5, in a one pot procedure wherein each pair of stable $A_mB_n$ monomers were reacted in the presence of diphenyl sulphone ("DPS") and cesium flouride catalyst ("CsF") at about 240 degrees Centigrade for 5 minutes. PEI 19 is a branched random copolymer with a DB=0.6 X and (X)·(n+1) B endgroups per molecule. To obtain PEI 20, deprotection may be necessary, and reaction with dimethylformamide ("DMF"), TBS-Cl, and imidazole. PEI 19 is a branched random copolymer with a DB=0.6 X and n+1 B endgroups per molecule. PEI 20 is a branched random copolymer with a DB=0.6 X and n+1 B endgroups per molecule.

FIG. 3C illustrates the definition of the repeat unit designation that is used throughout the specification.

FIGS. 4A and 4B illustrate synthesis of stable hyperbranched PEIs 21, 22, 23, 23A, and 25 (DB=0–0.6) of the present invention via AB$_2$ polymerization. More specifically, stable linear $A_mB_n$ monomer 4 was reacted in the presence of diphenyl sulphone ("DPS") and cesium flouride catalyst ("CsF") at about 240 degrees Centigrade for 5 minutes in a one pot procedure to make hyperbranched polymer 21. Hyperbranched polymer 21 was reacted with tetrabutylammonium flouride ("TBAF") in the presence of tetrahydrofuran ("THF") to make hyperbranched polymer 22. Hyperbranched polymer 22 can then be placed under alkylating conditions to make hyperbranched polymer 23, where R=aryl or alkyl as desired. Hyperbranched polymer 23 has a DB=0.6 and n+1 B endgroups per molecule. Similarly, stable $B_n$ (where n=2) core monomer 24 can be made by using a non-fluoride anhydride in accordance with the synthesis shown in FIG. 1 and previously described, and then reacted with stable linear $A_mB_n$ monomer 4 in the presence of diphenyl sulphone ("DPS") and cesium flouride catalyst ("CsF") at about 240 degrees Centigrade for 5 minutes in a one pot procedure, with slow addition of $A_mB_n$ monomer to the core monomer 24 to make hyperbranched polymer 25. Hyperbranched polymer 25 has a DB greater than 0.6 and n+2 endgroups per molecule.

FIGS. 5A and 5B illustrate synthesis of stable dendritic PEIs 26 and 27 (DB=1.0) of the present invention via dendritic polymerization of a $B_n$ core and an AB'$_2$ monomer. More specifically, as shown in FIG. 5A, monomer 24 is reacted with monomer 6 in the presence of diphenyl sulphone ("DPS") and cesium flouride catalyst ("CsF") at about 240 degrees Centigrade for 5 minutes in a one pot procedure to make PEI 26. PEI 26 is a dendritic polymer with a DB=1.0 and n+2 endgroups per molecule. As shown in FIG. 5B, core 13 is reacted with monomer 6 in the presence of diphenyl sulphone ("DPS") and cesium flouride catalyst ("CsF") at about 240 degrees Centigrade for 5 minutes in a one pot procedure; then dimethylformamide ("DMF"), TBS-Cl, and imidazole are added, which results in dendritic polymer 27 having a DB=1.0 and n+3 endgroups per molecule.

FIG. 6A is a schematic representation of terminal (T), linear (L), and dendritic (D) building blocks of AB$_2$ type polymers.

FIG. 6B is a schematic representation of a linear AB$_2$ type polymer (DB=0) having a total of fourteen (14) monomer units.

FIG. 6C illustrates a hyperbranched AB$_2$ type polymer (DB=7/11) having a total of twenty-three (23) monomer units.

FIG. 6D illustrates a dendritic AB$_2$ type polymer (DB=1.0) from B$_3$ core.

FIG. 6E is a schematic representation of terminal ($T_{AB2}$), linear ($L_{AB2}$), dendritic ($D_{AB2}$), terminal ($T_{AB}$), and linear ($L_{AB}$) building blocks of AB/AB$_2$ type polymers.

FIG. 6F illustrates a branched AB/AB$_2$ type polymer (DB=7/11) having a total of twenty-three (23) monomer units. This molecule has the same degree of branching as the polymer in FIG. 6C, but is different in that it only has 18 endgroups as opposed to 24 for the fully hyperbranched polymer.

Figure 7:
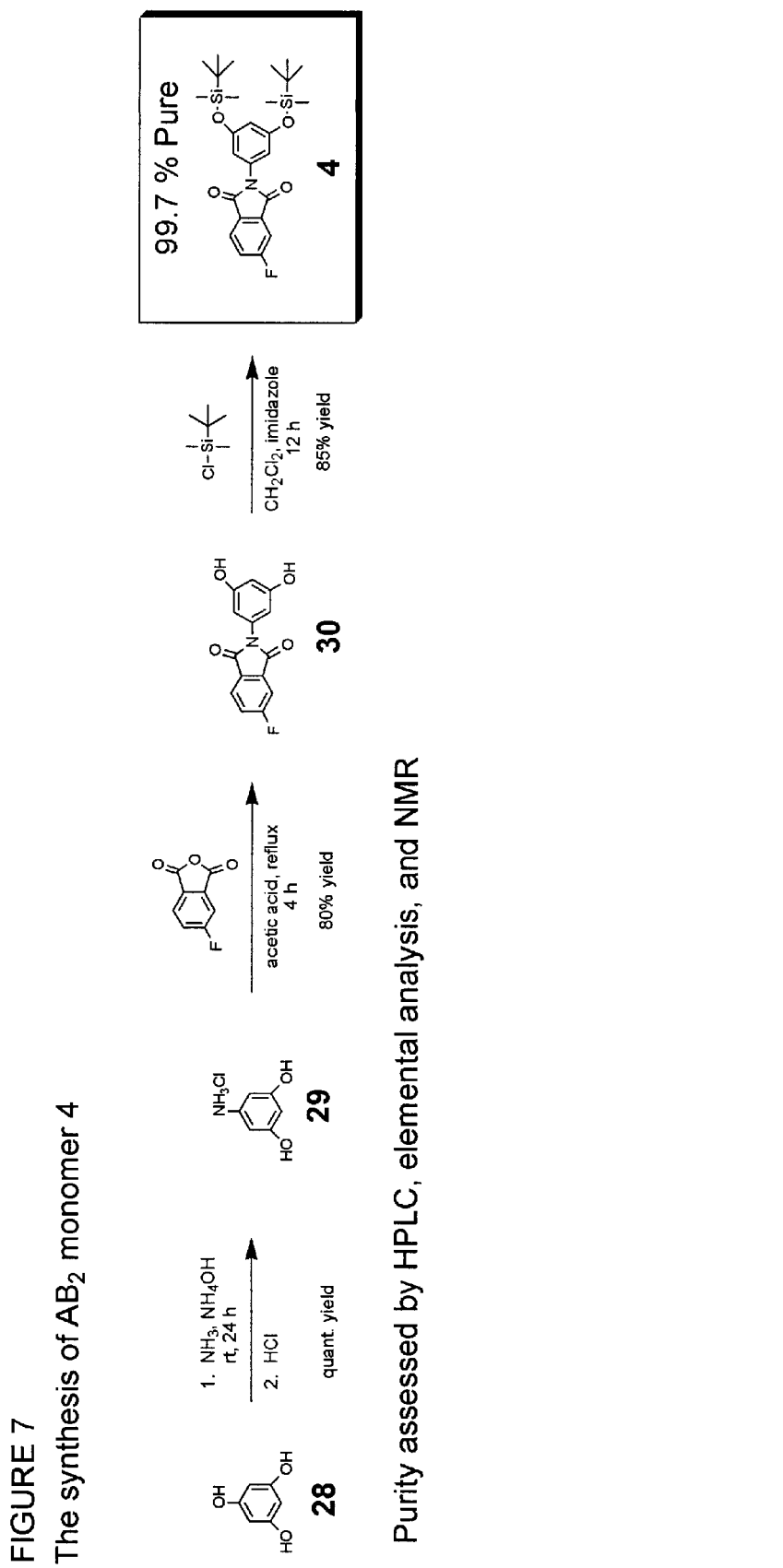
FIG. 7 illustrates the synthesis of stable AB$_2$ monomer 4 of the present invention using starting material 28 and converting it to a first intermediate 29 and then a second intermediate 30, and then converting intermediate 30 to the stable AB$_2$ monomer 4.

FIG. 7 illustrates the synthesis stable AB$_2$ monomer 4 of the present invention using starting material 28 and converting it to intermediates 29 and 30. As shown in FIG. 7, the starting materials comprise phloroglucinol dihydrate from Aldrich Chemical (i.e., starting material 28), 4-fluorophthalic anhydride from Marshalton Laboratories, and TBS-Cl from FMC Corporation.

FIG. 8A illustrates the AA/BB polymerization of a commercially available polymer 33, Ultem® using compounds 31 and 32, and mixing them with 2.0 moles of potassium carbonate (K$_2$CO$_3$), and DMF at 80 degrees Centigrade.

FIG. 8B illustrates $A_mB_n$ monomers 34 through 39 that can be synthesized by extrapolating from the chemistry shown in FIG. 8A.

FIG. 8C illustrates AB polymerizations (DB=0) of low molecular weight linear polymers 40 and 41 from $A_mB_n$ monomer 34 and 37 respectively in accordance with the polymerization conditions shown in FIG. 8A. Polymer 40 is a linear polymer with a DB=0 and 1B endgroup per molecule. Polymer 41 is a linear polymer with DB=0 and 1B endgroup per molecule.

Figure 9:
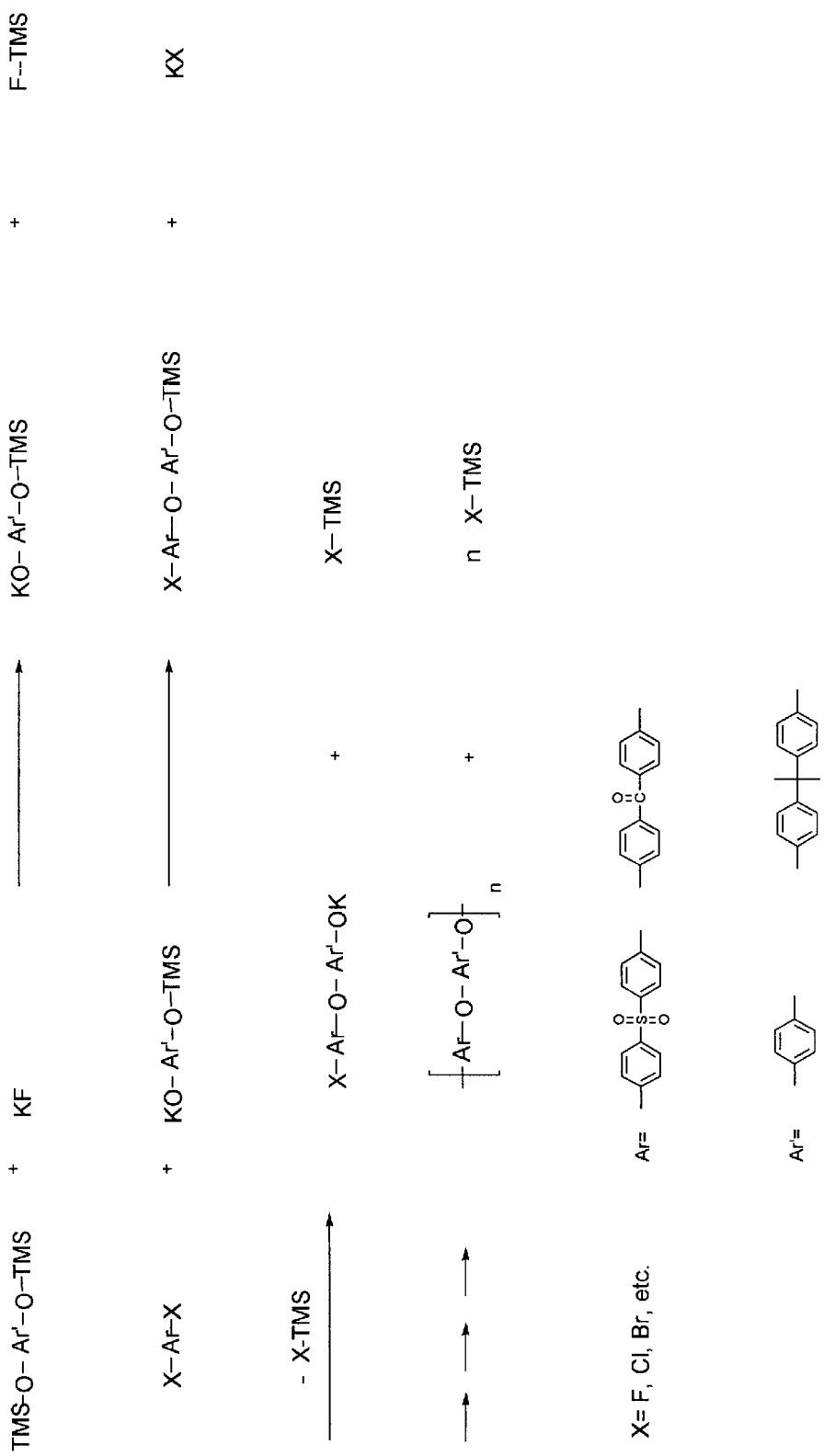
FIG. 9 illustrates the synthesis of polyarylene ethers from bis(trialkylsilyl)ethers of bisphenols (BB monomers) and activated bishalo compounds (AA monomers).

FIG. 9 illustrates the synthesis of polyarylene ethers from bis(trialkylsilyl)ethers of bisphenols (BB monomers) and activated bishalo compounds (AA monomers). FIG. 9 shows prior art methods to make polyarylethers that are different from the ethers of the present invention.

Figure 10A:
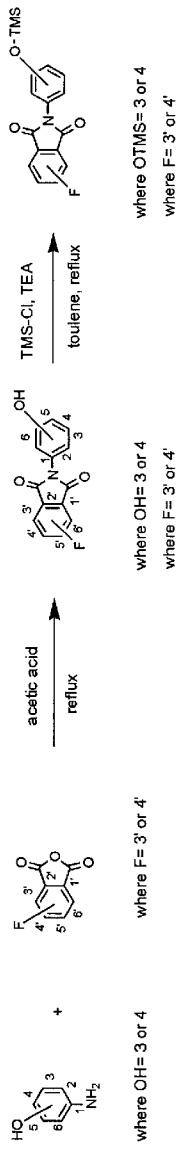
FIG. 10A illustrates the synthesis of AB monomers in accordance with prior methods using trimethyl silylchloride.

FIG. 10A illustrates the synthesis of AB monomers in accordance with prior methods using trimethyl silylchloride.

Figure 10B:
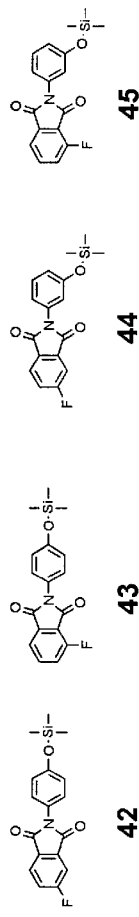
FIG. 10B illustrates AB monomers 42 through 45 made in accordance with prior methods using trimethyl silylchloride.

FIG. 10B illustrates AB monomers 42 through 45 made in accordance with prior methods using trimethyl silylchloride.

Figure 10C:
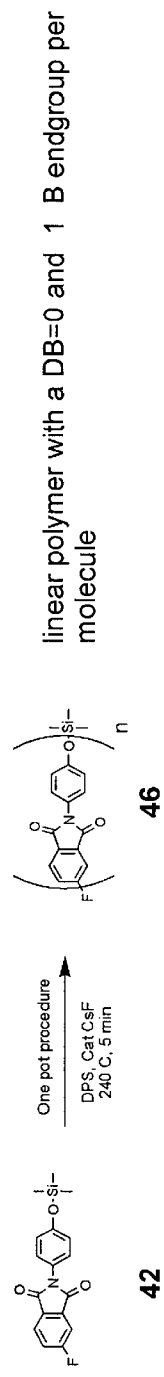
FIG. 10C illustrates linear AB polymer 46 (DB=0) made using AB monomer 42.

FIG. 10C illustrates linear AB polymer 46 (DB=0) made using AB monomer 42. Polymer 46 is a linear polymer with a DB=0 and 1B endgroup per molecule.

FIG. 11A illustrates linear polymers covalently linked to the endgroups of a hyperbranched polymer. By using linear polymer endgroups similar to the linear polymer into which hyperbranched particles ("HBP") will be doped, the particle should be effectively camoflauged.

FIG. 11B illustrates "stealth" hyperbranched nanoparticles in a polymer film or coating on a substrate. Thus, incorporation of "stealth" hyperbranched particles into polymer melts, films, and composites of linear compounds can be accomplished. Such incorporation can be used for toughening, efficient high-density crosslinking agents, and Theological modifiers for reducing melt viscosities.

FIGS. 12A and 12B illustrate selective phase separation and migration of hyperbranched particles to polymer film surfaces as a means of modifying surface properties. As shown in FIG. 12B, phase separation and migration occur under annealing due to an unfavorable free energy of mixing between the polymer film and the hyperbranched particles.

FIG. 12C illustrates preliminary studies of phase separation of tert-butyl dimethyl silylether ("TBS") terminated hyperbranched polymers ("HBP") and linear Ultem®. These studies indicate that phase separation to the bulk polymer (i.e., the major constituent) surface may be occurring. From XPS measurements there is an increase in the atomic concentration silicon (% Si) near the surface with respect to carbon (% C) upon annealing.

FIG. 13 illustrates a thermal gravimetric analysis of AB linear polyetherimide 16 of the present invention.

FIG. 14 illustrates a thermal gravimetric analysis of AB linear polyetherimide 21 of the present invention.

FIG. 15 illustrates the intrinsic viscosity versus molecular weight (MW) from GPC data of linear AB polyetherimide 16 and the hyperbranched $AB_2$ polyetherimide 21 of the present invention.

Figure 16:
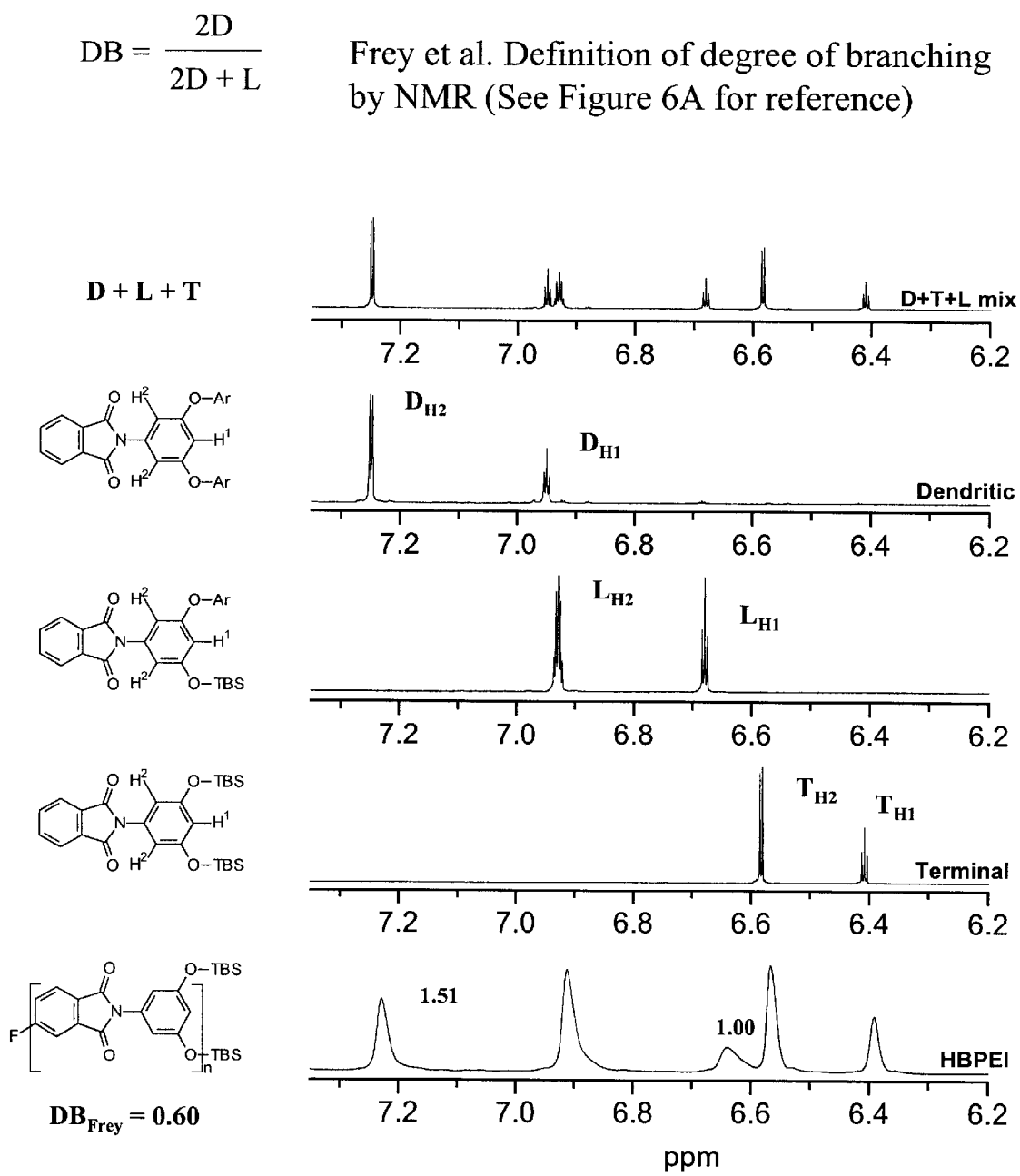
FIG. 16 illustrates the determination of degree of branching (DB) from proton nuclear magnetic resonance (NMR) of $AB_2$ polyetherimide 21.

FIG. 16 illustrates the determination of degree of branching (DB) from proton nuclear magnetic resonance (NMR) of $AB_2$ polyetherimide 21.

Figure 17:
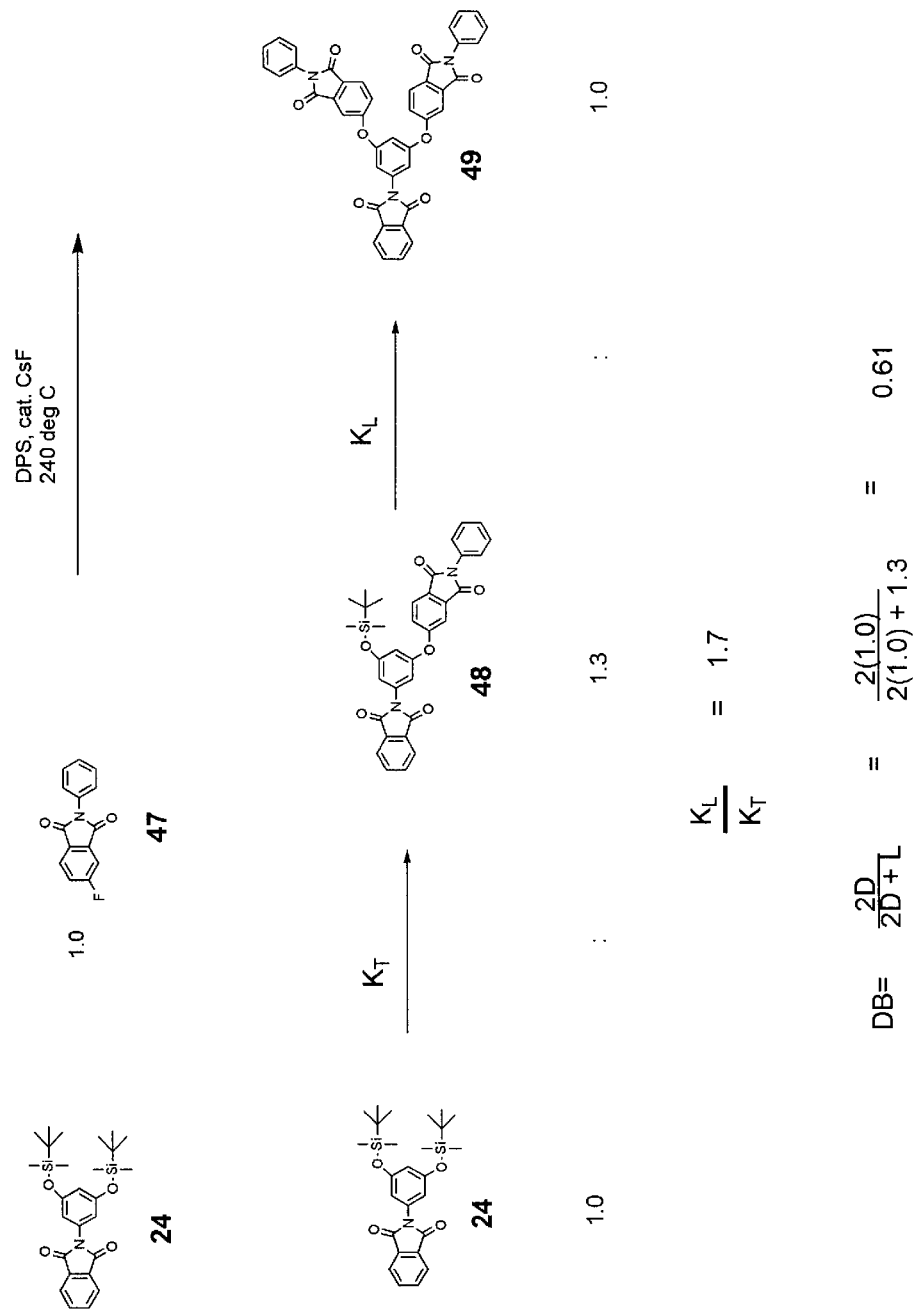
FIG. 17 illustrates a model study to determine the degree of branching (DB) of branching in a one pot $AB_2$ polymerization, i.e., using $A_mB_n$ monomer 24 and compound 47 to produce polymers 48 and 49.
Figure 18:
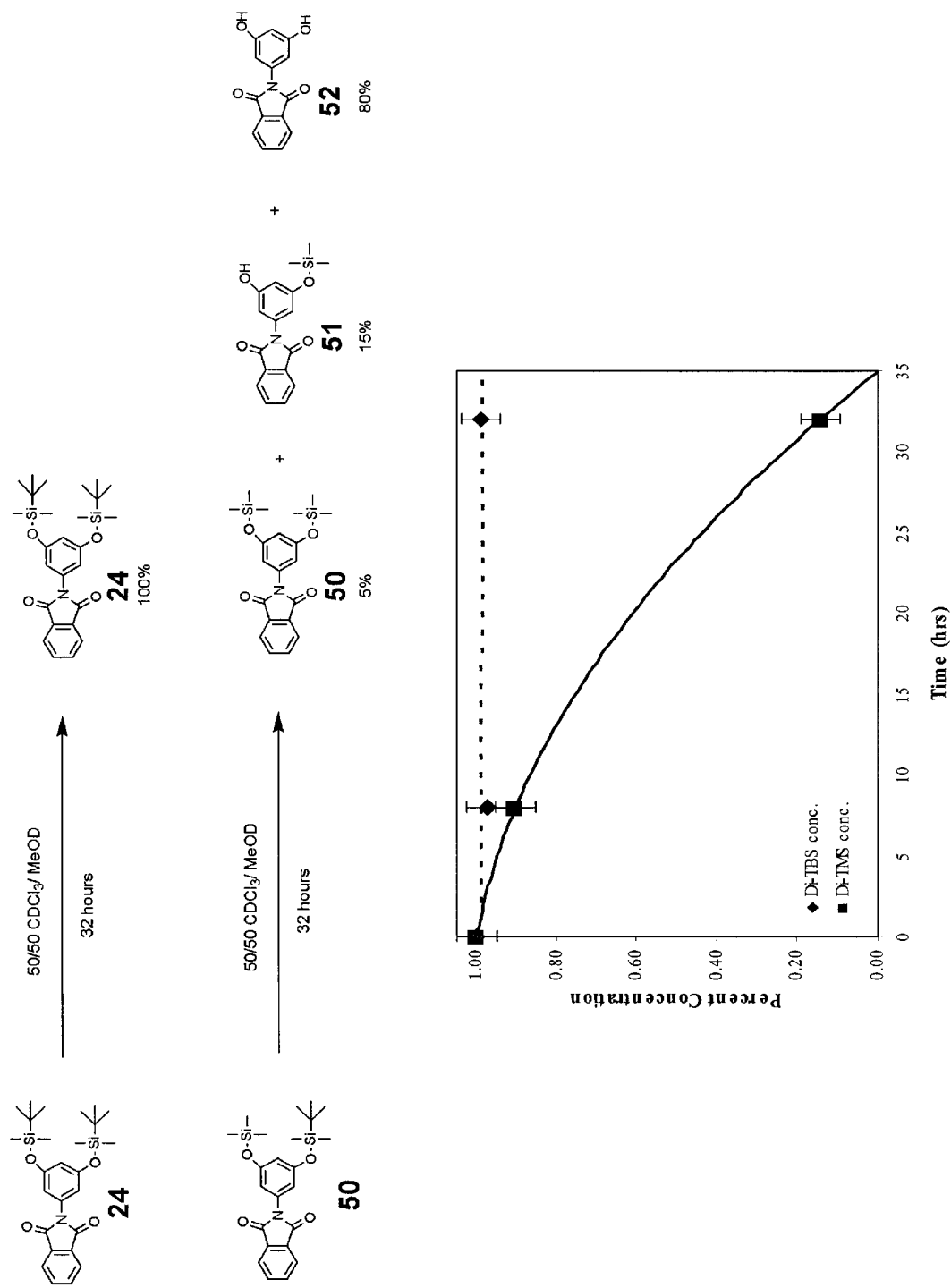
FIG. 18 illustrates a stability comparison between $B_n$ monomer 24 of the present invention and a $B_n$ monomer 50 of the prior art, and that monomer 50 is unstable and degrades to compounds 51 and 52.

FIG. 17 illustrates a model study to determine the degree of branching (DB) of branching in a one pot $AB_2$ polymerization, i.e., using $B_n$ monomer 24 and compound 47 to produce model compounds 48 and 49. FIG. 18 illustrates a stability comparison between $B_n$ monomer 24 of the present invention and a $B_n$ monomer 50 of the prior art, and that monomer 50 is unstable and degrades to compounds 51 and 52. More specifically, a plot of bis-silylated proton integration versus time shows that after 32 hours, monomer 24 of the present invention has not degraded, while monomer 50 of the prior art degrades to the point where only 5% of monomer remains. This illustrates the great and significant advantages of the stable monomers of the present invention over the prior art since the presence of 51 and 52 leads to chain terminating monomers and low molecular weight polymers.

Figure 19A:
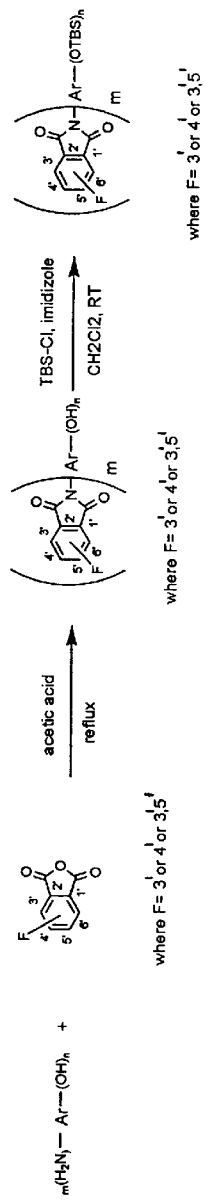
FIG. 19A illustrates synthesis of $A_mB_n$ monomers of the present invention.

FIG. 19A illustrates synthesis of $A_mB_n$ monomers of the present invention.

Figure 19B:
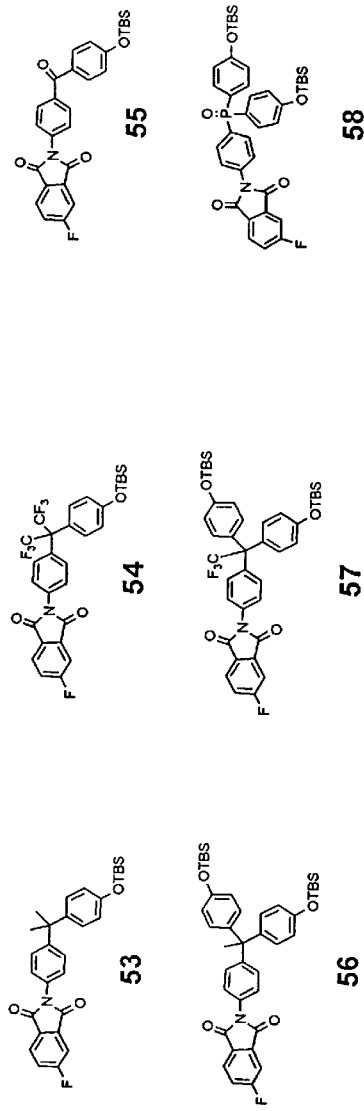
FIG. 19B illustrates specific stable $A_mB_n$ monomers 53 through 58 of the present invention.

FIG. 19B illustrates specific stable $A_mB_n$ monomers 53 through 58 of the present invention.

Figure 19C:
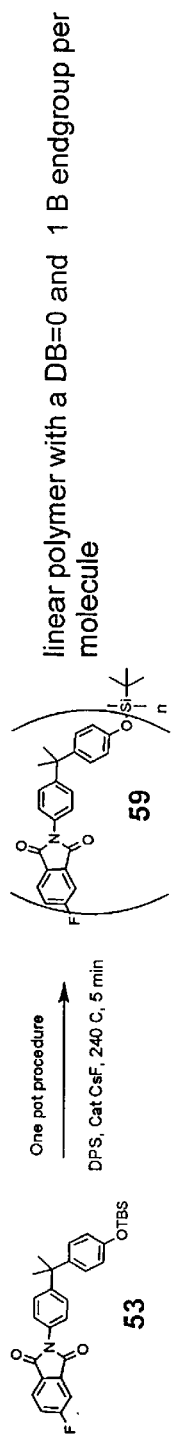
FIG. 19C illustrates synthesis of $A_mB_n$ polyetherimide 59 from $A_mB_n$ monomer 53.

FIG. 19C illustrates synthesis of $A_mB_n$ polyetherimide 59 from $A_mB_n$ monomer 53.

FIG. 20A illustrates the synthesis of AA monomers.

FIG. 20B illustrates the synthesis of BB monomers.

FIG. 20C illustrates AA/BB monomers 60 and 61.

FIG. 20D illustrates AA/BB polymerization of compounds 60 and 61 to make linear polymer 62 (DB=0 and 1B endgroup per molecule).

Figure 21A:
FIG. 21A illustrates synthesis of $B_n$ cores.

FIG. 21A illustrates synthesis of $B_n$ cores.

Figure 21B:
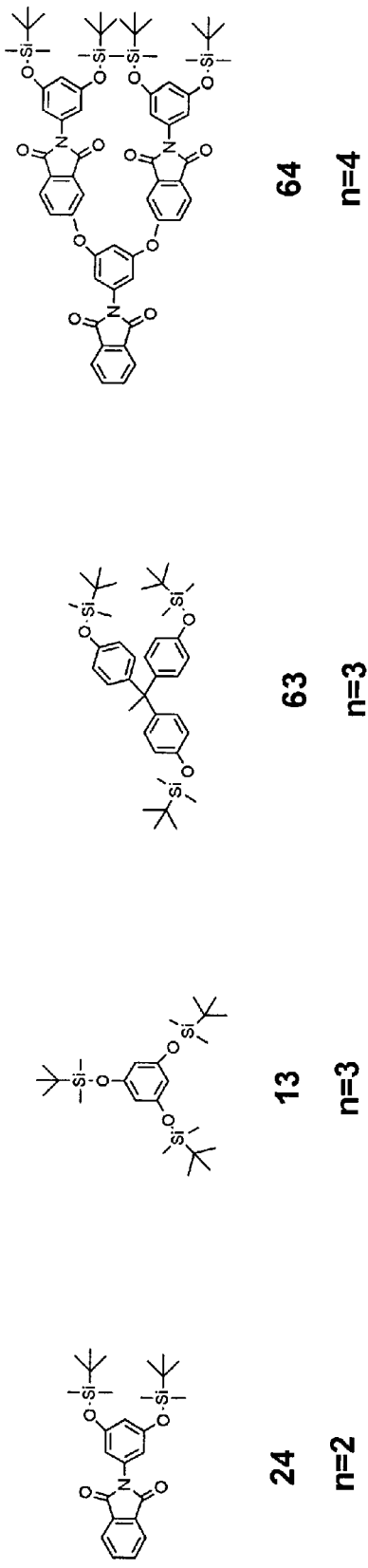
FIG. 21B illustrates $B_n$ cores 24, 13, 63, and 64 of the present invention.

FIG. 21B illustrates $B_n$ cores 24, 13, 63, and 64 of the present invention.

Figure 22A:
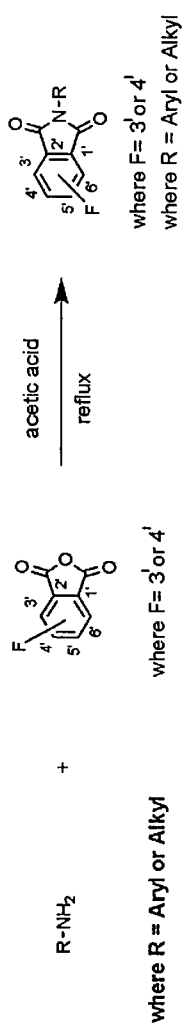
FIG. 22A illustrates synthesis of $A_m$ endcapping agents.

FIG. 22A illustrates synthesis of $A_m$ endcapping agents.

Figure 22B:
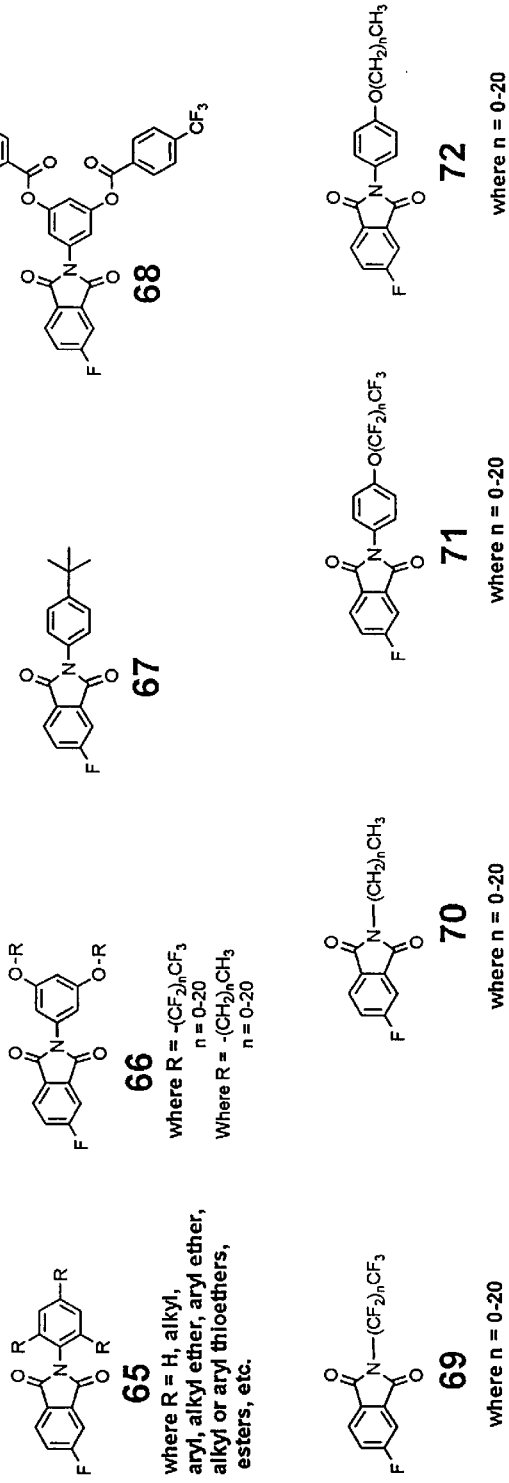
FIG. 22B illustrates examples of $A_m$ endcapping agents 65 through 72.

FIG. 22B illustrates examples of $A_m$ endcapping agents 65 through 72.

Figure 23A:
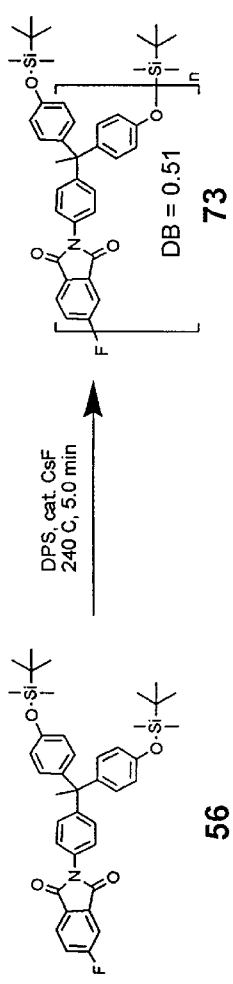
FIG. 23A illustrates synthesis of hyperbranched polyetherimide 73 from $AB_2$ monomer 56.

FIG. 23A illustrates synthesis of hyperbranched polyetherimide 73 from $AB_2$ monomer 56.

FIG. 23A illustrates synthesis of hyperbranched polyetherimide 73 from $AB_2$ monomer 56, showing that the polymerization methods shown in FIGS. 2A–B, 3A–C, 4A–C and 5A–B are not structure specific but general for making branched or hyperbranched polyetherimides from $A_mB_n$ type monomers where m=1 and n>1.

Figure 23B:
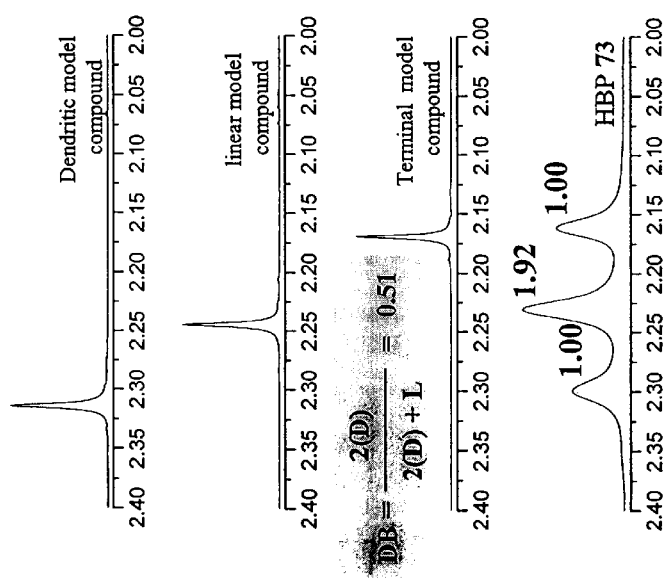
FIG. 23B illustrates degree of branching (per $^1$H NMR analysis) of hyperbranched polymer 73.

FIG. 23B illustrates degree of branching (per $^1$H NMR analysis) of hyperbranched polymer 73.

Figure 23C:
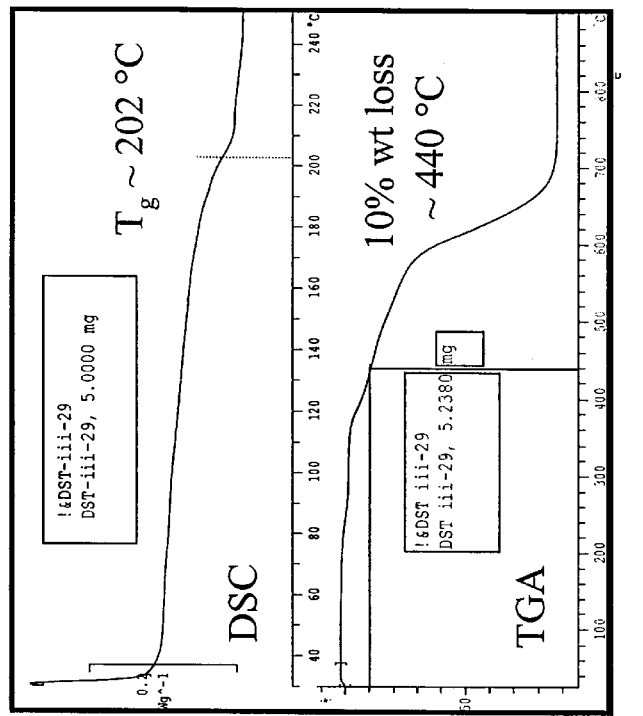
FIG. 23C illustrates thermal analysis of hyperbranched polymer 73.

FIG. 23C illustrates thermal analysis of hyperbranched polymer 73 which illustrates the thermal and oxidative stability of this class of materials.

FIG. 24 illustrates thermal analysis, and other properties, of a series $AB/AB_2$ branched polymers with the generic structure of polymer 19 and also shows the extreme thermal and oxidative stability of these materials and the predictable glass transition behavior of branched polyetherimides.

Figure 25A:
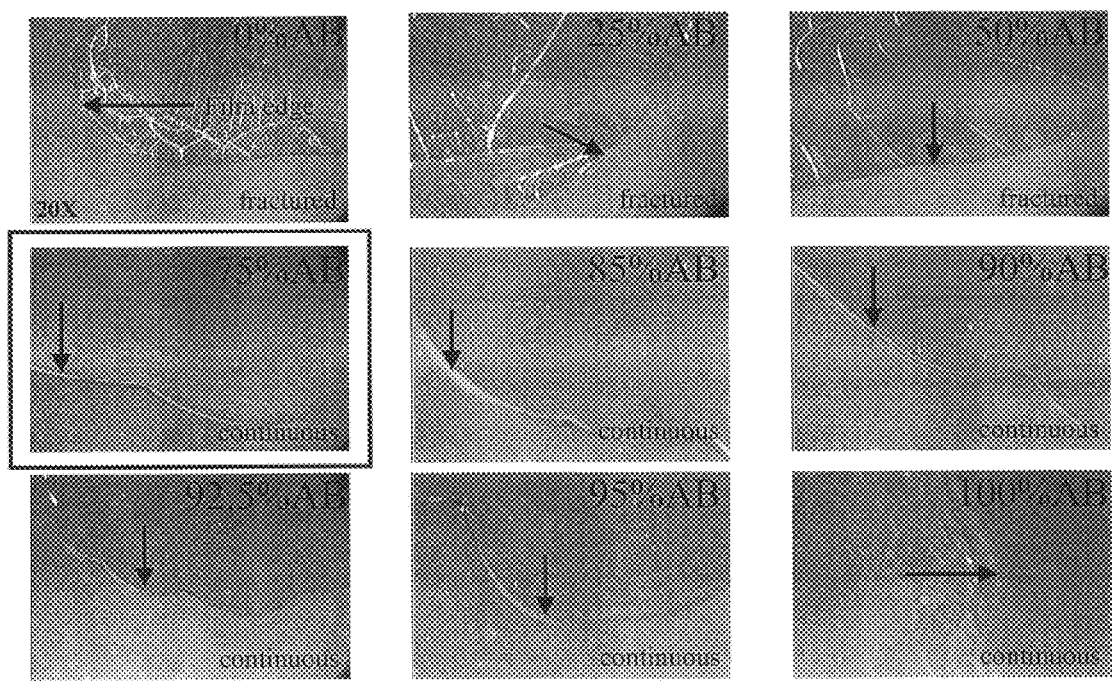
FIG. 25A illustrates the film forming ability of a series $AB/AB_2$ branched polymers with the generic structure of polymer 19 (FIG. 24) as synthesized in FIG. 3A.

FIG. 25A illustrates the film forming ability of a series $AB/AB_2$ branched polymers with the generic structure of polymer 19 (FIG. 24) as synthesized in FIG. 3A. As can be seen, copolymers with a composition of less than 75% AB monomer 7, make non-continuous films.

Figure 25B:
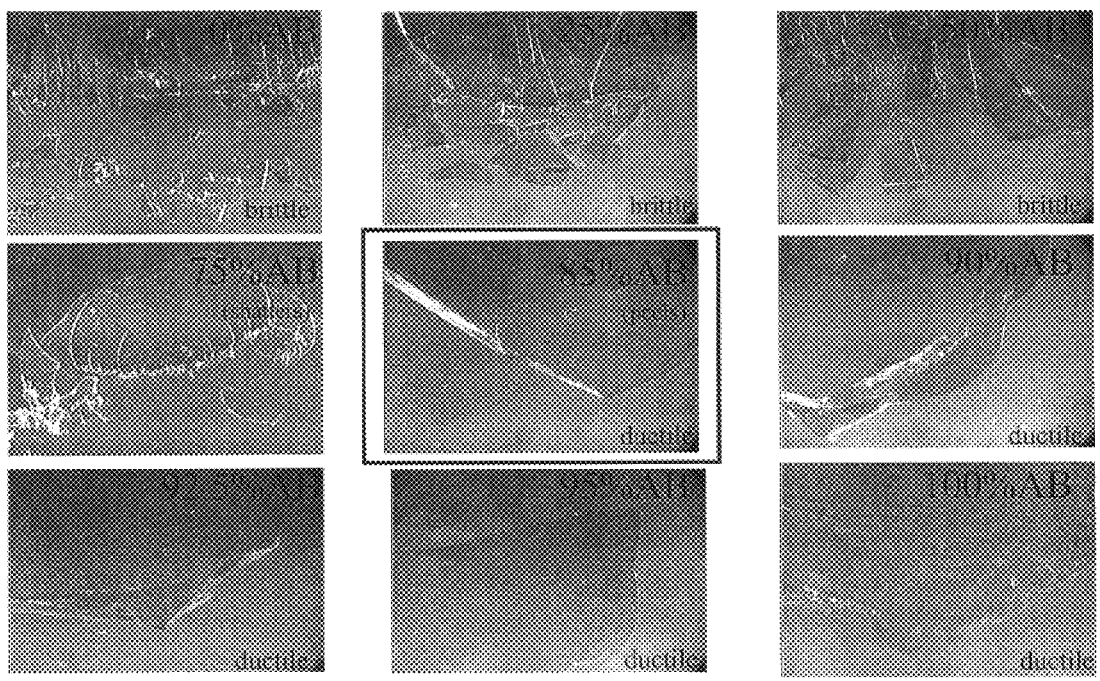
FIG. 25B illustrates the film ductility of a series $AB/AB_2$ branched polymers with the generic structure of polymer 19 (FIG. 24) as synthesized FIG. 3A.

FIG. 25B illustrates the film ductility of a series $AB/AB_2$ branched polymers with the generic structure of polymer 19 (FIG. 24) as synthesized in FIG. 3A. As can be seen, copolymers with a composition of less than 85% AB monomer 7, make brittle films. This outcome is undesirable when mechanical integrity of a film is desired. Thus, there may exist an optimum composition that affords the benefits of a branched polymer (e.g. high solubility, low viscosity) as well as the benefits of linear polymer (mechanical stability). The present invention has the capacity to alter the physical properties of the branched polymer by changing the $AB/AB_2$ ratio to achieve the desired properties as well as the endgroup composition by either terminating the reaction with an $A_1$ endcapping agent as shown in FIG. 4B or extending the synthetic method shown in FIG. 4A to $AB/AB_2$ branched polymers with the generic structure of polymer 19 (FIG. 24) as synthesized in FIG. 3A.

FIG. 26 illustrates the inherent viscosity behavior of a series $AB/AB_2$ branched polymers with the generic structure of polymer 19 (FIG. 24) as synthesized in FIG. 3A. This figure further illustrates that there is an optimum composition that affords the benefits of a branched polymer (e.g. high solubility, low viscosity) as well as the benefits of linear polymer (mechanical stability). This composition for this particular polymer is between 75% and 95% AB. However, the optimum composition is application specific and can be determined by varying the ratio $AB/AB_2$ ratio to achieve the desired properties and processing conditions.

FIG. 27 illustrates the adhesion behavior of an octadecyloxy-terminated hyperbranched polymer of the generic structure 23A as synthesized in FIG. 4B as compared to commercially available poly(methyl methacrylate), polystyrene, and Rhodamine dye to a polyethylene substrate.

The figure illustrates that films generated from branched polymers of the generic structure 23A, terminated with alkyl chains (in this current example $C_{18}$), have superior adhesive qualities (as shown by a standard tape test) to polyolefins (in this example polyethlyene) than those of commercially available linear polymers (in this example poly(methyl methacrylate) and polystyrene). However, the optimum composition is application specific and can be determined by varying the compostion of the endcapping agent to achieve the desired properties and processing conditions.

FIGS. 28A and 28B illustrate the general schematic description of the branched and hyperbranched polymeric structure of the present invention which contains at least one etherimide branch point from the group comprising any of the following structures shown therein (and also as claimed in claim 1).

There are critical differences between the methods of the prior art and the present invention. More specifically, the silyl electrophile used in prior methods was trimethyl silylchloride ("TMS"), while the silyl electrophile used in the present invention is tert-butyl dimethyl silylchloride ("TBS"). As shown in FIG. 18, monomer products made according to the prior art using TMS is chemically unstable and unable to be purified into a range (98–100%) that could be used to make a high MW polymer. On the other hand, the monomer products made according to the present invention using TBS are stable and can be purified into a range (98–100%) that can be used to make to a high MW polymer. Those of skill in the art will recognize these results as unexpected and surprising.

The instability of the monomers of the prior art is more acute at elevated temperatures, and under the polymerization conditions leads to low Mw polymers of unknown structure. By changing the silylether to TBS (see also FIG. 18), stable monomers 1 and 7 (FIG. 1B) were produced and were found to be highly crystalline AB monomers with superior thermal and chemical stability than the corresponding TMS monomers 42 and 44 (FIG. 10B). The TBS monomers were polymerized using similar conditions that had been used by Bryant and St. Clair, but at a much lower temperature (240° C.) and in a much shorter reaction time (5 minutes). Polymer 15 (FIG. 2B) from monomer 1 was shown to be insoluble in all solvents except for sulfuric acid. Polymer 16 (FIG. 2B) from monomer 7 was synthesized as well and shown to be of high molecular weight (per GPC) but relatively insoluble as well (i.e., only soluble in m-cresol, DMAc, NMP, and sulfuric acid; not soluble in DMF as was stated in U.S. Pat. No. 4,297,474). The chemistry of the polymer backbone was verified by NMR spectroscopy in conjunction with model compound studies.

Upon demonstration of the AB monomer synthesis, the same procedure was used to produce the thermally and chemically stable $AB_2$ monomer 4. This was polymerized the same way as the AB monomer, but the resulting $AB_2$ polymer 21 (FIG. 4A) was soluble in almost all organic solvents, excluding hexane, diethyl ether, alcohols, DMSO and $H_2O$, due to the fact that the endgroups were still fully intact, which was shown by NMR studies. Polymer 21 was shown to have high MW and a degree of branching between 0.6 and 0.7 via combinations of GPC, NMR and model compound studies. An $AB_2$ monomer in which the B functionalities are spatially and electronically isolated would, in all probability, result in a polymer with a DB approximately equal 0.5. In the present invention however, the B groups are not spatially and electronically isolated and are activated toward nucleophilic attack leading to an enhanced degree of branching >0.5.

In the present invention, polymer 21 was modified by removing the TBS groups to produce the free phenols 22 (FIG. 4A). The new polymer 22, with the same degree of branching and similar MW, gave a whole new solubility profile. The material was no longer soluble in the less polar organic solvents and only soluble in polar solvents like THF, DMF, NMP and slightly alkaline aqueous solutions. It was shown that the polymers of the present invention have physical properties that are dominated by the endgroup functionalities, and not the repeat unit. This is in direct contrast to high MW linear polymers whose physical properties are dominated by the structure of the repeat unit and not the end groups. Hence, it is desirable to be able to control the degree of branching to tailor a polymer structure to target physical properties that lie between those of the linear and "perfect" dendritic structures.

The methods of the present invention produce stable crystalline $A_mB_n$ monomers in three easy steps in a cost efficient manner (see e.g. FIG. 7). More specifically, the present invention provides methods to create polyetherimide polymers from these stable monomers or combinations thereof, thereby providing control of the degree of branching of the polymers between 0 and 1 (FIGS. 1–5), and end groups according to the desired physical property profile. Thus, the present invention provides for the optimization of polymer manufacture, and the attainment of a wide variety of applications.

The majority of polyetherimides are non-crystalline and their glass transition temperatures are in a range of 200–280° C. PEIs are injection moldable and exhibit high modulus, good ductility, excellent thermal stability, and flame resistance as well as good electrical properties. These properties make this class of polymers outstanding for high-performance engineering-thermoplastic applications. However, one problem associated with prior PEIs, for example Ultem®, is that they have an extremely high melt viscosity. This makes injection molding parts and composites very difficult due to the high pressures and temperatures needed to induce adequate flow. It has been shown that hyperbranched and dendritic polymers exhibit unique solution and melt viscosity properties. See Frechet J.; Hawker C. J.; Gitson I.; Leon J. W., Journal of Material Science-Pure Applied Chemistry 1996, A33(10), 1399–1425; and Kim Y. H., Journal of Polymer Science 1998 36, 1685–1689. The hyperbranched and dendritic polymers of the present invention similarly have unique solution and melt viscosity properties (see FIG. 26).

Hyperbranched and dendritic polymers exhibit much lower viscosity than that of their linear counterparts. It is believed that by adding small amounts of HBP of the present invention to commercially available polymers (e.g., Ultem®) the melt and/or solution viscosity of these materials can be reduced without compromising the integrity (i.e., physical properties) of the injection moldable parts or composites. This translates into faster production rates and ease of production, which is very desirable from an economic standpoint.

Another problem addressed by the present invention is to reduce the tendency for polymer blends to phase separate. This problem can be avoided by effectively camouflaging the HBP of the present invention by strategically selecting endgroups or linear polymer chains (see e.g. FIGS. 11A–B) that make the particle (HBP) compatible/homogenous in the surrounding matrix. It is contemplated that such camouflaged particles of the present invention could be used as molecular tougheners, molecular reinforcers, plasticizers, or flame retardants in a wide variety of industrial applications.

Because the particle size is much less than the wavelength of light, these particles should not scatter light, meaning that the blend will remain transparent.

Alternatively, use of phase separation/segregation can be used advantageously. For example, if desired, the HBP of the present invention can migrate to a surface of a thin film or bulk material (see FIGS. 12A–C), and the endgroups can be tailored to facilitate this migration and provide the desired properties at the surface, such as decreased oxygen permeability, adhesiveness, lubrication, or a hydrophilic/hydrophobic surface (see FIG. 27).

The products of present invention also overcome other problems associated with the prior art. For example, prior high MW polymers, and polyimides/polyetherimides in particular, tend to be very insoluble, making solution formation difficult. In order to use these prior materials as coatings or films, as is often done in the microelectronics encapsulation process, it is necessary to dissolve the prior materials in high boiling polar aprotic solvents such as NMP, DMAc, HMPA, or DMF. The problem with these solvents is that they are expensive, toxic, very high boiling and thus difficult to remove. These problems make the commercial process very costly, from a production and waste disposal perspective. Thus, it is desirable to have new materials that have the same mechanical, chemical, and thermal stability as the linear analogs except with the unique property of being soluble in low boiling, non-toxic organic solvents such as ethyl acetate, acetone, or water(see FIG. 24).

The HBPs of the present invention fulfill this need. They can be modified to be water soluble and could possibly be used for high-temperature water-borne coatings which are ideal from an environmental standpoint. Prior to the present invention, materials with such properties have been unknown.

Since the present invention provides modifiable endgroups, the present invention can be used to create extremely dense areas of latent functionality. This is desirable in the area of photolithographic applications where dense regions of photosensitive endgroups and the inherent increase in solubility could lead to higher resolution capabilities. Dense areas of functionality are also desirable in the area of adhesives, thermosets, or crosslinked resins. These dense regions of functionality could lead to increased adhesiveness or decreased solubility and swelling in the crosslinked resins. One such application is for use in capillary GC columns as a stationary phase.

Thermal gravimetric analysis has been done on the linear polymer 16 and the hyperbranched polymer 21, and they are shown to degrade very similarly in both nitrogen and air atmospheres (see FIGS. 13 and 14). The linear polymer 16 has a 10% weight loss at 572° C. and the hyperbranched polymer 21 has a 10% weight loss at 538° C., indicating very good thermal and oxidative stability for both materials.

GPC studies to determine MW and solution viscosity dependence on MW show that the high molecular weight linear polymers have a solution viscosity approximately four times that of their hyperbranched analogs. The plot of viscosity versus MW (see FIG. 15) is similar to that shown by Frechet et al., supra, for hyperbranched polymers.

Solubility studies have been undertaken and the hyperbranched polymer 21 is orders of magnitude more soluble than its linear polymer counterparts, i.e., linear polymers 15 and 16.

A number of model compounds have been made and characterized in order to determine the degree of branching and the end group composition of the hyperbranched polymer through NMR studies (see FIG. 16). A model compound study has been done to extrapolate relative rates of reaction between the two B groups on the $AB_2$ monomer (see FIG. 17). The results indicate a 2.0 times enhancement in the reaction rate of the second B group, leading to a higher degree of branching of 0.61 than what would be expected if the two groups had equal reactivity (DB=0.50).

Another model compound study (see FIG. 18) was performed to determine the stability of the TBS versus the TMS endgroups, which are paramount for the prescribed reaction conditions. Utilizing NMR studies, it was shown that the di-TMS model compound 50 had appreciably decomposed after 32 hours, while the di-TBS compound 24 was fully intact. This indicates that the di-TBS monomer is much more stable than the di-TMS and more easily purified.

Further, hyperbranched polymers of the present invention have been systematically blended in solution with commercially available Ultem®. The blend was then used to cast thin films of the polymer blends, and the films were annealed. The surface was then monitored (using XPS techniques) to determine surface migration of the HBP. The data shown in FIG. 12C indicates that the HBP will preferentially migrate to the surface under the appropriate processing conditions.

High MW Ultem® has been synthesized (see FIG. 20D), showing that method of the present invention is amenable to the synthesis of existing monomer and polymer systems and can be extended to other polyethers or polyetherimides (see FIG. 19).

Monomers 1, 4, and 6 and the corresponding homopolymers 15, 16, 21, and 22 have been synthesized. It has been shown that high molecular weight linear polymers from monomer 7 and high MW hyperbranched polymers from monomer 4 with a degree of branching between 0.6–0.7 can be made. In accordance with the present invention, polymers with DB between 0–1.0 can be made using the teachings of the present invention. For example, monomer 4 can be used alone or in combination with monomer 5 and/or monomer 7 in known ratios (see FIGS. 3A–B) to control the degree of branching between 0–0.6. Slow monomer addition (see FIG. 4A–C) or dendritic growth techniques can be employed (see FIG. 5A–B) to make thermally, hydrolitically, and oxidatively stable, high MW polymers with a degree of branching >0.6 and approaching that of a dendrimer. In addition, the present invention can be used to make monomer 10 (or others shown in FIG. 1B) to enhance the rate of reactivity of the second B group so that a higher degree of branching in a one-pot synthesis can be achieved.

A number of $B_n$ cores can be synthesized in accordance with the present invention (see FIGS. 21A–B) to grow macromolecules with different three-dimensional shapes and sizes. By synthesizing hyperbranched and dendritic structures of different shapes and sizes, the endgroups as shown in FIGS. 3A–B can be derivatized as desired. The present invention permits the manufacture of linear polymer chains with desired R groups (see FIGS. 11A–B), as well as small reactive molecules that alter the reactivity or bulk physical properties as previously discussed. The following examples further describe the preferred embodiments of the present invention.

EXAMPLE 1

Synthesis and Characterization of $A_mB_n$ Monomers 4 and 7.

Monomer 4 was prepared as shown in FIG. 7 and is described as follows. First, intermediate 30 (3,5-dihydroxyphenyl-4-fluorophthalimide) was prepared as follows: to a 100 mL round bottom flask was added 19.8 g (121 mmol) of the hydrochloride salt of 3,5-dihydroxy aniline (see Thorn, M. A.; Denny, G. H.; Babson, R. D. *J. Org. Chem.* 1975, 40, 1556–1558), 50 mL of glacial acetic acid, and 22.2 g (134 mmol) of 4-fluorophthalic anhydride. The mixture was stirred at reflux for 4 hours. Then flask was removed from heat and then the reaction product, intermediate 30, was precipitated in 1 L of water and isolated by filtration as an off-white solid. The intermediate 30 was dried under vacuum at 100° C. overnight (14.71 g, 87%): $^1$H NMR (CD$_2$Cl$_2$, 500 MHz) δ 9.634 (bs, 2H), 7.981 (dd, J=8.40, 4.55, 1H), 7.792 (dd, J=7.41, 2.28, 1H), 7.670 (ddd, J=9.39, 8.37, 2.28), 6.285 (s, 3H); $^{13}$C NMR (CD$_2$Cl$_2$, 125 MHz) δ 167.0, 166.2, 165.8, 165.8, 165.0, 158.5, 134.7, 134.6, 133.1, 127.8, 127.8, 126.3, 126.2, 121.7, 121.4, 111.3, 111.1, 105.8, 102.6; MS (EI) (calcd for $C_{14}H_8FNO_4$, 273.0437; found 273.0439) m/e 273 (100), 229 (9), 94 (6), 71 (6), 57 (8).

Then, to a 500 mL round bottom flask was added 24.1 g (88.2 mmol) of 3,5-dihdroxyphenyl-4-fluorophthalimide 30, 27.95 g (185 mmol) of tert-butyldimethylsilyl chloride, 12.6 g (185 mmol) of imidazole, and 250 mL of CH$_2$Cl$_2$. The reaction was stirred at ambient temperature for 12 h. The imidazole salts were removed by filtration and the CH$_2$Cl$_2$ was removed in vacuo. The white solid was recrystallized from heptane to yield monomer 4 (3,5-di-tert-butyldimethylsilyloxyphenyl-4-fluorophthalimide) (38.7 g, 88% isolated yield): $^1$H NMR (CD$_2$Cl$_2$, 500 MHz) δ 7.953 (ddd, J=8.25, 4.55, 0.31, 1H), 7.607 (ddd, J=7.31, 2.30, 0.33, 1H), 7.475 (ddd, J=8.96, 8.26, 2.35), 6.577 (d, J=2.20, 2H), 6.415 (t, J=2.19, 1H), 1.001 (s, 18H), 0.247 (s, 12H); $^{13}$C NMR (CD$_2$Cl$_2$, 125 MHz) δ 168.2, 166.5, 166.2, 166.2, 157.3, 135.1, 135.1, 133.3, 128.2, 128.2, 126.7, 126.6, 122.2, 122.0, 112.5, 112.3, 111.9, 111.6, 26.0, –4.2; MS (EI) m/e 502 (18), 501 (44), 445 (42), 444 (100), 388 (11), 222 (15), 148 (13), 73 (34); Anal. Calcd for $C_{26}H_{36}FNO_4Si_2$: C, 62.24; H, 7.23; N, 2.79. Found: C, 61.93; H, 7.11; N, 2.85.

Monomer 7 was prepared as shown in FIG. 1A and as described as follows. First, intermediate 4-fluoro-N-3-hydroxyphenyl phthalimide was prepared as follows: to a 500 mL round bottom flask fitted with a reflux condenser and stir bar was charged 4-fluorophthalic anhydride (30.4 g, 183.3 mmol), 3-aminophenol (20 g, 183.3 mmol), and 250 mL glacial acetic acid. The mixture was stirred at room temperature for 10–15 minutes, then placed into a 130° C. oil bath and brought to reflux. The reaction was stirred under a nitrogen atmosphere for 4 hours. The flask was then cooled to room temperature, resulting in formation of a precipitate. Water (250 mL) was added and the solid was collected by vacuum filtration, washed with H$_2$O, and dried overnight to afford a white solid in 95% yield. $^1$HNMR (d$_6$-DMSO): δ 9.77 (s, 1 H), 8.02 (dd, 1 H, J=8.3, 4.6), 7.86 (ddd, 1 H, J=7.6, 2.3, 0.5), 7.72 (ddd, 1 H, J=9.5, 8.3, 2.4), 7.30 (m, 1 H), 6.85 (m, 3 H). Anal. Calcd for $C_{14}H_8NO_3F$: C, 65.37; H, 3.13; N, 5.45. Found: C, 65.43; H, 2.95; N, 5.23.

Then, to a 500 mL flask with a stir bar was charged 4-fluoro-N-3-hydroxyphenyl phthalimide (44 g, 171 mmol), t-butyldimethylsilylchloride (27.1 g, 180 mmol), imidazole (12.3 g, 180 mmol), and 250 mL CH$_2$Cl$_2$. This heterogeneous solution was stirred under a nitrogen atmosphere overnight. The imidazole salts were removed by filtration and the mother liquor was concentrated in vacuo and crystallized from hexane to yield monomer 7 (4-Fluoro-N-3-t-butyldimethylsiloxyphenyl phthalimide) (94% isolated yield). $^1$HNMR (CD$_2$Cl$_2$): δ 7.95 (ddd, 1 H, J=8.2, 4.6, 0.5), 7.61 (ddd, 1 H, J=7.2, 2.4, 0.5), 7.48 (ddd, 1 H, J=9.3, 8.3, 2.3), 7.37 (m, 1 H), 7.02 (ddd, 1 H, J=8.1, 1.9, 1.1), 6.92 (m, 2 H), 1.00 (s, 9 H), 0.24 (s, 6 H).

EXAMPLE 2

Synthesis and Characterization of Polyetherimde Polymers 21–23 and 23A

Polymer 21 was prepared as shown in FIG. 4A and described as follows. First, a silicon oil bath was preheated to 240° C. Then, a polymerization vessel containing monomer 4 (10 mmol), diphenylsulphone (5 g), and CsF catalyst (30 mg) was quickly immersed in the bath. The solid reagents melted immediately forming a slightly yellow molten solution. Within seconds of melting, the reaction mixture began bubbling vigorously and TBDMS fluoride evolution was observed. The mixture was stirred until bubbling ceased (approximately 5.0 minutes after all solids had melted) and the reaction was removed from heat and cooled. Before solidification, the reaction mixture was taken up in hot toluene followed by acetone, which were then removed in vacuo yielding a white powder. This powder was slurried in hot ethanol and the insoluble polymer was separated from the DPS by filtration and isolated as a white amorphous powder to yield hyperbranched polyetherimide 21 in 92% isolated yield. Polymer 21 was characterized by $^1$H NMR (FIG. 16), TGA (FIG. 14), DSC, gel permeation chromatography and inherent viscosity measurements.

Polymer 22 was prepared as shown in FIG. 4A and described as follows. Polymer 21 was stirred in either tetrabutyl ammonim fluoride in THF or pyridinium. HF overnight to remove TBS endgroups. The resulting solid was isolated by precipitation into EtOH and filtered and dried at 100 degrees centigrade to yield hyperbranched polyetherimide 22. Polymer 22 was characterized by $^1$H NMR, gel permeation chromatography, TGA and DSC.

Polymer 23 was prepared as shown in FIG. 4A and described as follows. Polymer 22 was dissolved in THF, acylated with 4-triflouromethyl benzoyl chloride in the presence of an organic base overnight. The resulting polymer was precipitated into EtOH, filtered and dried to afford end-group modified hyperbranched polyetherimide 23. Polymer 23 was characterized by $^1$H NMR, TGA, DSC, and gel permeation chromatography.

Polymer 23A was prepared as shown in FIG. 4B and described as follows. First, a silicon oil bath was preheated to 240° C. Then, a polymerization vessel containing monomer 4 (10 mmol), diphenylsulphone (5 g), and CsF catalyst (30 mg) was quickly immersed in the bath. The solid reagents melted immediately forming a slightly yellow molten solution. Within seconds of melting, the reaction mixture began bubbling vigorously and TBDMS fluoride evolution was observed. The mixture was stirred until bubbling ceased (approximately 5.0 minutes after all solids had melted) at which time an equimolar amount(10 mmol) of $A_1$, endcapping agent 66 (See Example 3), diphenyl sulphone (5 g) and CsF catalyst (30 mg) was added and the reaction was allowed to stir for an additional 5 minutes, at which time the vessel was removed from heat and cooled. Before solidification, the reaction mixture was taken up in hot toluene followed by acetone, which was then removed in vacuo yielding a white powder. This powder was slurried in hot ethanol and the insoluble polymer was separated from the DPS by filtration and isolated as a white amorphous powder to give hyperbranched polyetherimide 23A in 85% isolated yield. Polymer 23A was characterized by $^1$H NMR, TGA, DSC, gel permeation chromatography and solubility experiments.

EXAMPLE 3

Synthesis and Characterization of $A_1$ Endcapping Agents $A_1$ endcapping agent 66 was prepared as shown in FIG. 22A and described as follows. To a 500 mL round-bottom flask equipped with a magnetic stir bar and reflux condenser was charged intermediate 30 (5.46 g, 20 mmol), cesium carbonate (16.44 g, 50 mmol, 1.25 equiv), and acetonitrile (250 mL). The assembly was purged with $N_2$ and was lowered into an oil bath at 80° C. and was permitted to stir at temperature for 30 min. Then bromooctane (14.0 mL, 15.6 g, 81 mmol, 2 equiv) was added via syringe and the reaction was permitted to stir under $N_2$ over 48 h. A neutralized aliquot indicated complete reaction, so the reaction mixture was poured into $H_2O$ (200 mL) made acidic by the addition of $HNO_3$ (35 mL, 1.5 M). The water layer was extracted with $CH_2Cl_2$ (3×250 mL), and the organic aliquots were combined and dried with brine. Rotary evaporation was then used to reduce the organic volume by half, at which point MeOH (250 mL) was added and evaporation continued, in an attempt to triturate the product out of solution. Instead a dark oil appeared, which was dissolved in $CH_2Cl_2$ (50 mL) and triturated with MeOH (450 mL). A milky precipitate appeared, which was filtered and dried to give $A_1$ endcapping agent 66 (3,5-dioctoxyphenyl-4-fluorophthalimide) in 80% yield (7.95 g was obtained). TLC—$R_f$=0.47 (9:1 petroleum ether/EtOAc). MS (FAB) 498.5 (m+1, 100%). $^1H$ NMR (500 MHz, $CDCl_3$, δ): 7.95 (d-d, $J_{HH}$=8.3 Hz, $J_{HF}$=4.4 Hz, 1H, 12), 7.61 (d-d, $J_{HF}$=6.9 Hz, $J_{HH}$=2.4 Hz, 1H, 15), 7.45 (t-d, $J_{HH/HF}$=8.8 Hz, $J_{HH}$=2.2 Hz, 1H, 13), 6.53 (d, J=2.2 Hz, 2H, 8), 6.50 (t, J=2.5 Hz, 1H, 6), 3.94 (t, J=6.6 Hz, 4H, 5), 1.77 (mult, 4H, 4), 1.44 (mult, 4H, 2), 1.35–1.25 (mult, 16H, 3), 0.88 (t, J=7.0 Hz, 6H, 1). $^{13}C$ NMR (125 MHz, $CDCl_3$, δ): 166.79 (14, $J_{CF}$=258.0 Hz), 166.31 (10), 166.00 (17, $J_{CF}$=2.5 Hz), 160.70 (7), 134.78 (16, $J_{CF}$=9.3 Hz), 132.92 (9), 127.71 (11, $J_{CF}$=2.6 Hz), 126.32 (12, $J_{CF}$=9.5 Hz), 121.64 (13, $J_{CF}$=24.4 Hz), 111.62 (15, $J_{CF}$=24.9 Hz), 105.54 (8), 101.78 (6), 68.44 (5), 31.98 (4), 29.50 (3), 29.40 (3), 29.32 (3), 22.82 (2), 14.25 (1). Calcd for $C_{30}H_{40}NO_4F$: C, 72.41; H, 8.10; N, 2.81. Found: C, 72.66; H, 8.18; N, 3.02.

EXAMPLE 4

Synthesis and Characterization of Branched Copolymer 19

Polymer 19 was prepared as shown in FIG. 3A and described as follows. The polycondensations were performed by quickly immersing a polymerization vessel containing monomers 4 and 7 (10 mmol total), 5 g diphenylsulphone (DPS), and a catalytic amount of cesium fluoride (30 mg, 2 wt %) into a preheated 240° C. silicon oil bath stirred under a nitrogen atmosphere. The solid reagents melted immediately and formed a slightly yellow molten solution. Within seconds of melting, the reaction mixture began bubbling vigorously and TBDMS fluoride evolution was observed. After the mixture was mechanically stirred for the designated time (5 min. after all solids had melted) the reaction vessel was removed from heat and allowed to cool slightly. Before solidification, the contents were diluted with 30 mL DMAc and filtered to remove the insoluble catalyst. The DMAc solution was then precipitated by dropwise addition to rapidly stirred hot ethanol and the polymer was separated from the solution by filtration and isolated as a white amorphous powder. The resulting polymer was dried under vacuum at 140° C. for 24 h. After drying, $^1H$ NMR analysis in $d_6$-DMF was used to confirm the absence of residual DPS. If DPS was detected, the polymers were re-dissolved in 30 mL of DMAc and re-precipitated into hot ethanol, filtered, and dried again at 140° C. for 24 h yielding polymer 19 in 70% yield. Polymer 19 was characterized by $^1H$ NMR, TGA, DSC, gel permeation chromatography and solubility experiments (see FIG. 24).

EXAMPLE 5

Synthesis and Characterization $AB_2$ Monomer 56

Monomer 56 was prepared as shown in FIG. 19A and as described as follows. First, 1,1-bis-(4-hydroxyphenyl)-1-p-nitrophenylethane was prepared as follows: to a 300 mL round bottom flask was added 20.0 g (121.1 mmol) of 4-nitroacetophenone and 57.8 g (605 mmol) of phenol and a magnetic stir bar. The flask was fitted with a reflux condenser, was purge with nitrogen and placed into a 105° C. oil bath. When the solid reactants melted and formed a homogeneous stirring solution ~0.5 g (2.5 mmol) of trifluoromethane sulphonic acid was added. The solution turned from yellow to dark orange/red in color. The reaction was refluxed for 72 h. The reaction was allowed to cool and the phenol was removed by steam distillation. The remaining dark red viscous oil was extracted into EtOAc and the organic layers were combined and dried over $MgSO_4$. The drying agent was filtered off and the EtOAc was removed in vacuo and the product was dried under vacuum. Column chromatography was performed eluting with 18:1 $CH_2Cl_2$: EtOAc. Solvent was removed in vacuo and the product was dried under vacuum to give 35.1 g of a yellow solid material. To give intermediate 1,1-bis-(4-hydroxyphenyl)-1-p-nitrophenylethane in 80% yield. Chemical structure was determined by $^1H$ and $^{13}H$ NMR.

Then, to a 500 mL round bottom flask was added 20.0 g (59.6 mmol) of intermediate 1,1-bis-(4-hydroxyphenyl)-1-p-nitrophenylethane, 15 g of KS-10 graphite, 8.95 g (179 mmol) of hydrazine monohydrate, and 300 mL of absolute ethanol. The flask was fitted with a reflux condenser and placed in an 80° C. oil bath. The reaction was refluxed for 24 h. The reaction was removed from the oil bath and allowed to cool. The graphite was filtered off and the graphite was washed with acetone. The filtrate was dried over $MgSO_4$ and the drying agent filtered off. The solvent was removed in vacuo to give a viscous oil. The oil was dried under vacuum overnight. To the viscous oil in a 1 L flask was added 400 mL of glacial acetic acid and 9.9 g (59.6 mmol) of 4-fluorophthalic anhydride. The flask was fitted with a reflux condenser and reflux under nitrogen for 4 h. The reaction was allowed to cool and then poured slowly into 1.5 liters of cold water. The product precipitated out was collected by filtration. The product was dried under vacuum for 24 h to give 22.7 g of 1,1-bis-(4-hydroxyphenyl)-1-p-(4-fluorophthalimido)phenylethane, an off-white solid in 84% yield. Chemical structure was determined by $^1H$ and $^{13}H$ NMR.

Lastly, to a 300 mL round bottom flask was added 4.15 g (27.5 mmol) of tert-butyldimethylsilyl chloride, 6.0 g (13.2 mmol) of intermediate 1,1-bis-(4-hydroxyphenyl)-1-p-(4-fluorophthalimido)phenylethane, 1.88 g (27.5 mmol) of imidazole, and 300 mL of $CH_2Cl_2$. The mixture was stirred under nitrogen for 12 h. The solid imidazole salts were filtered off and the $CH_2Cl_2$ was removed in vacuo. The white solid was taken up in hot hexane and filtered again to remove the remaining imidazole salts and the product was recrystallized from hexane to give 8.3 g of $AB_2$ monomer 56 (1,1-bis-(4-tert-butyldimethylsilyloxyphenyl)-1-p-(4-fluorophthalimido) phenylethane) as a white solid in 93% yield. Chemical structure was determined by $^1H$ and $^{13}H$ NMR.

EXAMPLE 6

Synthesis and Characterization of Hyperbranched Polymer 73

Polymer 73 was prepared as shown in FIG. 23A and described as follows. First, a silicon oil bath was preheated to 240° C. Then, a polymerization vessel containing monomer 56 (10 mmol), diphenylsulphone (5 g), and CsF catalyst (30 mg) was quickly immersed in the bath. The solid reagents melted immediately forming a slightly yellow molten solution. Within seconds of melting, the reaction mixture began bubbling vigorously and TBDMS fluoride evolution was observed. The mixture was stirred until bubbling ceased (approximately 5.0 minutes after all solids had melted) and the reaction was removed from heat and cooled. Before solidification, the reaction mixture was taken up in hot toluene followed by acetone, which were then removed in vacuo yielding a white powder. This powder was slurried in hot ethanol and the insoluble polymer was separated from the DPS by filtration and isolated as a white amorphous powder to yield Hyperbranched Polyetherimide 73 in 94% isolated yield. Polymer 21 was characterized by $^1$H NMR, TGA, DSC (FIG. 23B–C), gel permeation chromatography and inherent viscosity measurements.

The invention has been described in detail with particular reference to certain preferred embodiments thereof, and those of skill in the art will appreciate that variations and modifications are within the spirit and scope of the present invention as set forth in the following claims.

What is claimed is:

1. A branched or hyperbranched polymeric structure which contains at least one etherimide branch point from the group comprising any of the following generic structures:

(a) at least one structural unit which is considered to be an etherimide branch point of an $A_1B_2$ type having at least one of the following structures

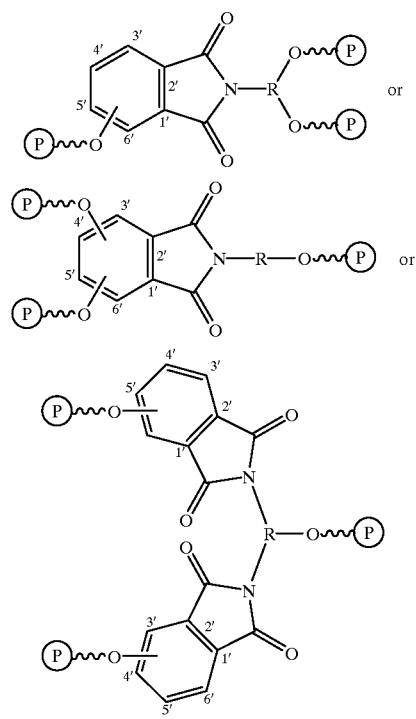

where    R   = any chemical structure covalently bound to the nitrogen of the arylimide where    (P)   = a polymeric structure covalently bound to the etherimide branch point;

(b) at least one structural unit which is considered to be an etherimide branch point of an $A_1B_3$ type having at least one of the following structures

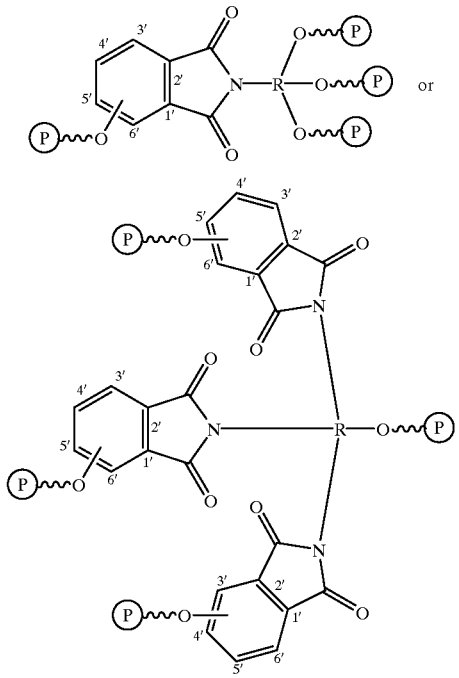

where    R   = any chemical structure covalently bound to the nitrogen of the arylimide where    (P)   = a polymeric structure covalently bound to the etherimide branch point;

(c) At least one structural unit similar to those in (b) above and derived from $A_1B_n$ branch points (where n>3);

(d) at least one structural unit which contains an aryl imide and is considered to be an etherimide branch point of an $A_1B_2$ type of which the naphthalimide structures below are an example having at least one of the following structures

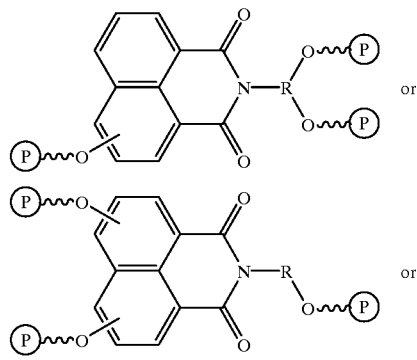

-continued

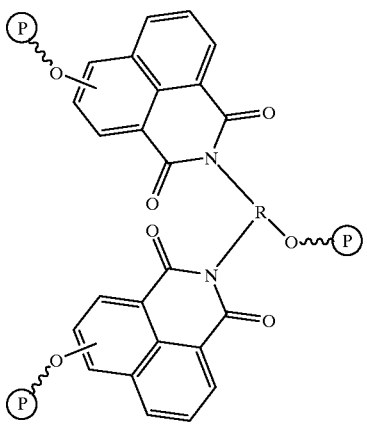

where R = any chemical structure covalently bound to the nitrogen of the arylimide where (P) = a polymeric structure covalently bound to the etherimide branch point;

(e) at least one structural unit which contains an aryl imide and is considered to be an etherimide branch point of an $A_1B_2$ type and of which the naphthalimide structures below are an example having at least one of the following structures

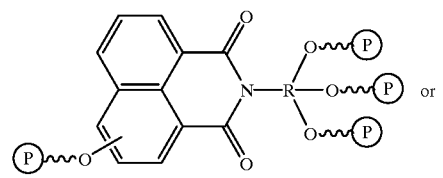 or

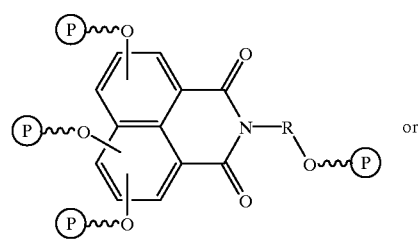 or

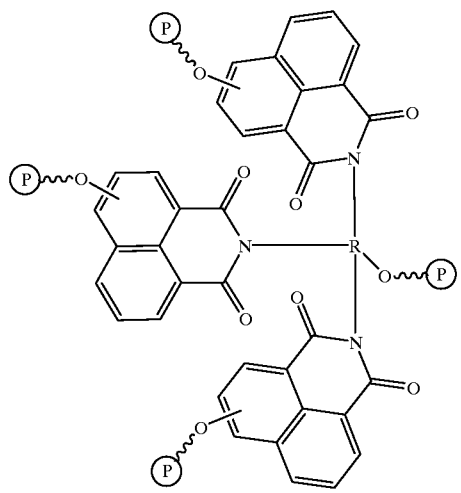

where R = any chemical structure covalently bound to the nitrogen of the arylimide where (P) = a polymeric structure covalently bound to the etherimide branch point; and (f) At least one structural unit similar to those in (e) above and derived from $A_1B_n$ branch points (where n>3).

2. A method to produce materials from at least one $A_mB_n$ monomer, (where m=1 and n≧1) comprising:

(a) reacting an amino-phenol and an aromatic anhydride using heat and in the presence of acetic acid to produce an arylimide;

(b) mixing the arylimide with a silyl electrophile and a base in the presence of an organic solvent, wherein the silyl electrophile has the structure

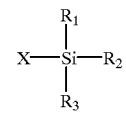

where either $R_1$, $R_2$, or $R_3$ or all ($R_1$, $R_2$, and $R_3$) have more than one carbon atom when m=1 and n=1, or $R_1$, $R_2$, or $R_3$ have one carbon atom or more when m=1 and n is greater than 1 and X is a leaving group; and (c) polymerizing the $A_MB_N$ monomer.

3. The method of claim 2, wherein the amino-phenol is an amino-di-phenol having the structure:

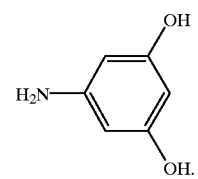

4. The method of claim 2, wherein the silyl electrophile is tert-butyl dimethyl silylchloride.

5. The method of claim 2, wherein the base is imidazole.

6. The method of claim 2, wherein the organic solvent is dichloromethane.

7. The method of claim 2, wherein the $A_mB_n$ monomer has the following structure

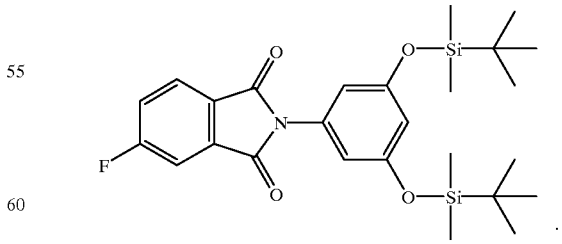

8. The method of claim 2, further comprising the step of polymerizing the $A_mB_n$ monomer in presence of a high temperature solvent and a fluoride catalyst at a temperature of about 180 to 300 degrees Centigrade.

9. The method of claim 8, wherein the $A_mB_n$ monomer has the structure in claim 7.

10. The method of claim 8, wherein the fluoride catalyst is cesium fluoride.

11. The method of claim 8, wherein the high temperature solvent is diphenyl sulphone.

12. The method of claim 8 wherein the resulting polymer has the following structure with various degrees of branching and molecular weights and at least two repeating units within the bracket:

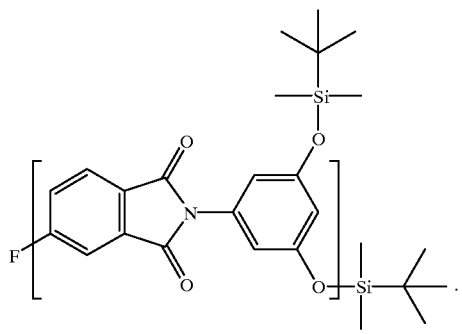

13. An $A_mB_n$ monomer(where m=1 and n≧1), made by the steps of:

(a) reacting an amino-phenol and an aromatic anhydride using heat and in the presence of acetic acid to produce an arylimide; and (b) mixing the arylimide with a silyl electrophile and a

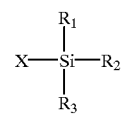

base in the presence of an organic solvent, wherein the silyl electrophile has the structure
where either $R_1$, $R_2$, or $R_3$ or all ($R_1$, $R_2$, and $R_3$)have more than one carbon atom when m=1 and n=1, or $R_1$, $R_2$, or $R_3$ have one carbon atom or more when m=1 and n is greater than 1 and X is a leaving group, produces the $A_mB_n$ monomers of the present invention.

14. A polymer made by polymerizing the $A_mB_n$ monomer of claim 13.

15. A coating comprising the polymer of claim 14.

16. A substrate coated with the coating of claim 15.

17. A material for injection molding comprising the polymer of claim 14.

18. An injection molded product made using the polymer of claim 14.

19. A computer chip product made using the polymer of claim 14.

20. A polymer product comprising a polymer and an additive comprising the branched and hyperbranched polymeric structures of claim 1.

21. Branched etherimide copolymers derived from the $A_mB_n$ monomers of claim 2 in combination with either AB, or AA, or BB monomers, $A_1$ end-capping agents, and $B_n$ cores.

22. A coating comprising branched and hyperbranched polymeric structures of claim 1.

* * * * *